(12) United States Patent
Von Novak et al.

(10) Patent No.: US 8,853,995 B2
(45) Date of Patent: Oct. 7, 2014

(54) DEVICES FOR CONVEYING WIRELESS POWER AND METHODS OF OPERATION THEREOF

(75) Inventors: William H Von Novak, San Diego, CA (US); Francesco Grilli, La Jolla, CA (US); Jeremy D Dunworth, San Diego, CA (US); Jonathan T Velasco, San Marcos, CA (US); MaryBeth Selby, San Jose, CA (US); David Maldonado, Chula Vista, CA (US); Stein A Lundby, Solana Beach, CA (US); Peng Li, San Diego, CA (US); Sandip S Minhas, San Diego, CA (US); Khaled Helmi El-Maleh, San Marcos, CA (US); Yair Karmi, San Diego, CA (US); Srinivas Raghavan, San Diego, CA (US); Alireza Hormoz Mohammadian, San Diego, CA (US); Ernest T Ozaki, Poway, CA (US); Rinat Burdo, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 500 days.

(21) Appl. No.: 12/780,649

(22) Filed: May 14, 2010

(65) Prior Publication Data

US 2010/0323616 A1 Dec. 23, 2010

Related U.S. Application Data

(60) Provisional application No. 61/186,784, filed on Jun. 12, 2009, provisional application No. 61/262,119, filed on Nov. 17, 2009.

(51) Int. Cl.
*H01M 10/44* (2006.01)
*H02J 7/34* (2006.01)
*H02J 7/00* (2006.01)
*H02J 7/02* (2006.01)

(52) U.S. Cl.
CPC . *H02J 7/025* (2013.01); *H02J 7/34* (2013.01); *H02J 7/0054* (2013.01)
USPC .......................................................... 320/103

(58) Field of Classification Search
USPC .......................... 320/103, 108, 112, 114, 115
See application file for complete search history.

(56) References Cited

U.S. PATENT DOCUMENTS

| | | |
|---|---|---|
| 3,938,018 A | 2/1976 | Dahl |
| 6,031,354 A | 2/2000 | Wiley et al. |

(Continued)

FOREIGN PATENT DOCUMENTS

| | | |
|---|---|---|
| AU | 2006249578 A1 | 11/2006 |
| CN | 1836348 A | 9/2006 |

(Continued)

OTHER PUBLICATIONS

International Search Report and Written Opinion—PCT/US2010/057117, ISA/EPO—May 17, 2011.

(Continued)

*Primary Examiner* — Edward Tso
(74) *Attorney, Agent, or Firm* — Knobbe Martens Olson & Bear LLP

(57) ABSTRACT

Exemplary embodiments are directed to wireless power. A method may comprise receiving wireless power with a receiver and charging an accumulator with energy from the received wireless power. The method may further include conveying energy from the accumulator to an energy storage device upon a charging level of the accumulator reaching a threshold level.

37 Claims, 15 Drawing Sheets

(56) References Cited

U.S. PATENT DOCUMENTS

| | | |
|---|---|---|
| 6,493,437 B1 | 12/2002 | Olshansky |
| 7,502,619 B1 | 3/2009 | Katz |
| 8,154,246 B1 | 4/2012 | Heitmann |
| 8,169,185 B2 | 5/2012 | Partovi et al. |
| 2002/0087335 A1 | 7/2002 | Meyers et al. |
| 2003/0013434 A1 | 1/2003 | Rosenberg et al. |
| 2003/0034757 A1 | 2/2003 | Woodnorth |
| 2004/0017181 A1 | 1/2004 | Sakai |
| 2004/0111360 A1 | 6/2004 | Albanese |
| 2005/0038614 A1 | 2/2005 | Botts et al. |
| 2006/0113955 A1* | 6/2006 | Nunally ............. 320/108 |
| 2006/0184705 A1 | 8/2006 | Nakajima |
| 2006/0287763 A1 | 12/2006 | Ochi et al. |
| 2007/0072474 A1 | 3/2007 | Beasley et al. |
| 2008/0116847 A1 | 5/2008 | Loke et al. |
| 2008/0122518 A1* | 5/2008 | Besser et al. ............. 320/137 |
| 2008/0157603 A1 | 7/2008 | Baarman et al. |
| 2008/0197802 A1 | 8/2008 | Onishi et al. |
| 2008/0210762 A1 | 9/2008 | Osada et al. |
| 2008/0221986 A1 | 9/2008 | Soicher et al. |
| 2008/0235332 A1 | 9/2008 | McChesney et al. |
| 2008/0249873 A1 | 10/2008 | Seelinger |
| 2008/0265835 A1 | 10/2008 | Reed et al. |
| 2009/0058361 A1* | 3/2009 | John ............. 320/128 |
| 2009/0106137 A1 | 4/2009 | Ochi et al. |
| 2009/0111492 A1 | 4/2009 | Dudley et al. |
| 2009/0128086 A1 | 5/2009 | Lee |
| 2009/0133733 A1* | 5/2009 | Retti ............. 320/134 |
| 2009/0156268 A1 | 6/2009 | Kim et al. |
| 2009/0215473 A1 | 8/2009 | Hsu |
| 2009/0243397 A1 | 10/2009 | Cook et al. |
| 2009/0251309 A1 | 10/2009 | Yamasuge |
| 2009/0327150 A1 | 12/2009 | Flake et al. |
| 2010/0036773 A1 | 2/2010 | Bennett |
| 2010/0167765 A1 | 7/2010 | Sarmah et al. |
| 2010/0171461 A1 | 7/2010 | Baarman et al. |
| 2010/0174629 A1 | 7/2010 | Taylor et al. |
| 2010/0201314 A1 | 8/2010 | Toncich et al. |
| 2010/0223136 A1 | 9/2010 | Wormald et al. |
| 2010/0253281 A1 | 10/2010 | Li |
| 2010/0256831 A1 | 10/2010 | Abramo et al. |
| 2010/0276995 A1 | 11/2010 | Marzetta et al. |
| 2011/0043327 A1 | 2/2011 | Baarman et al. |
| 2011/0082727 A1 | 4/2011 | Macias |
| 2011/0099065 A1 | 4/2011 | Georgis et al. |
| 2011/0115431 A1 | 5/2011 | Dunworth et al. |
| 2011/0115432 A1 | 5/2011 | El-Maleh et al. |
| 2011/0119135 A1 | 5/2011 | Grilli et al. |
| 2011/0119144 A1 | 5/2011 | Grilli et al. |

FOREIGN PATENT DOCUMENTS

| | | |
|---|---|---|
| CN | 1881674 A | 12/2006 |
| CN | 101056456 A | 10/2007 |
| CN | 101136556 A | 3/2008 |
| CN | 101136561 A | 3/2008 |
| CN | 101383435 A | 3/2009 |
| CN | 101447684 A | 6/2009 |
| CN | 101459981 A | 6/2009 |
| CN | 101520878 A | 9/2009 |
| EP | 1528652 | 5/2005 |
| EP | 1667308 A2 | 6/2006 |
| EP | 1734635 A2 | 12/2006 |
| EP | 2071695 A2 | 6/2009 |
| FR | 2879852 | 6/2006 |
| GB | 2438485 A | 11/2007 |
| JP | H06133476 A | 5/1994 |
| JP | 09046282 | 2/1997 |
| JP | 2001298511 A | 10/2001 |
| JP | 2001359166 A | 12/2001 |
| JP | 2002077464 A | 3/2002 |
| JP | 2002135375 A | 5/2002 |
| JP | 2002534827 A | 10/2002 |
| JP | 2002359008 A | 12/2002 |
| JP | 2004050383 A | 2/2004 |
| JP | 2004128827 A | 4/2004 |
| JP | 2005505997 A | 2/2005 |
| JP | 2005110421 A | 4/2005 |
| JP | 2005261187 A | 9/2005 |
| JP | 2006517378 A | 7/2006 |
| JP | 2006353042 A | 12/2006 |
| JP | 2007180195 A | 7/2007 |
| JP | 2007526730 A | 9/2007 |
| JP | 2007295192 A | 11/2007 |
| JP | 2008021042 A | 1/2008 |
| JP | 2008206233 A | 9/2008 |
| JP | 2008295191 A | 12/2008 |
| JP | 2009037044 A | 2/2009 |
| JP | 2009523402 A | 6/2009 |
| JP | 2009148151 A | 7/2009 |
| JP | 2009253763 A | 10/2009 |
| JP | 2010515425 A | 5/2010 |
| JP | 2010152633 A | 7/2010 |
| JP | 2010525785 A | 7/2010 |
| TW | I268429 | 12/2006 |
| TW | I302245 | 10/2008 |
| TW | 200941889 A | 10/2009 |
| WO | WO0039908 A1 | 7/2000 |
| WO | WO0054387 | 9/2000 |
| WO | WO03047064 A2 | 6/2003 |
| WO | WO2004114433 | 12/2004 |
| WO | WO-2006067350 A1 | 6/2006 |
| WO | WO2006127185 A2 | 11/2006 |
| WO | WO-2008133806 A1 | 11/2008 |
| WO | WO2008137996 A1 | 11/2008 |
| WO | 2009014125 A1 | 1/2009 |
| WO | WO2009009559 | 1/2009 |
| WO | WO-2009111597 A2 | 9/2009 |
| WO | WO2010036980 A1 | 4/2010 |
| WO | WO2010118161 | 10/2010 |
| WO | WO2011063054 | 5/2011 |

OTHER PUBLICATIONS

International Search Report and Written Opinion—PCT/US2010/057118—ISA/EPO—Apr. 27, 2011.

International Search Report and Written Opinion—PCT/US2010/057121, ISA/EPO—May 13, 2011.

International Search Report and Written Opinion—PCT/US2010/057122—ISA/EPO—May 26, 2011.

International Search Report and Written Opinion—PCT/US2010/038436, International Search Authority—European Patent Office—Sep. 17, 2010.

Robinson, Stuart. "Wireless Charging Will Quadruple Potential Combined Speed Charging" (Strategy Analytics, Inc.) Jul. 28, 2009.

* cited by examiner

DEVICES FOR CONVEYING WIRELESS POWER AND METHODS OF OPERATION THEREOF

CLAIM OF PRIORITY UNDER 35 U.S.C. §119

This application claims priority under 35 U.S.C. §119(e) to:

U.S. Provisional Patent Application 61/186,784 entitled "CHARGE ACCUMULATOR FOR WIRELESS POWER DEVICES" filed on Jun. 12, 2009, the disclosure of which is hereby incorporated by reference in its entirety; and U.S. Provisional Patent Application 61/262,119 entitled "WIRELESS POWER" filed on Nov. 17, 2009, the disclosure of which is hereby incorporated by reference in its entirety.

BACKGROUND

1. Field

The present invention relates generally to wireless power, and more specifically to devices for wirelessly transmitting power to an electronic device and methods of operation thereof.

2. Background

Typically, each battery powered device requires its own charger and power source, which is usually an AC power outlet. This becomes unwieldy when many devices need charging.

Approaches are being developed that use over the air power transmission between a transmitter and the device to be charged. These generally fall into two categories. One is based on the coupling of plane wave radiation (also called far-field radiation) between a transmit antenna and receive antenna on the device to be charged which collects the radiated power and rectifies it for charging the battery. Antennas are generally of resonant length in order to improve the coupling efficiency. This approach suffers from the fact that the power coupling falls off quickly with distance between the antennas. So charging over reasonable distances (e.g., >1-2 m) becomes difficult. Additionally, unintentional radiation (e.g., due to plane wave radiation) can interfere with other systems if not properly controlled through filtering.

Other approaches are based on inductive coupling between a transmit antenna embedded, for example, in a "charging" mat or surface and a receive antenna plus rectifying circuit embedded in the host device to be charged. This approach has the disadvantage that the spacing between transmit and receive antennas must be very close (e.g. millimeters). Though this approach does have the capability to simultaneously charge multiple devices in the same area, this area is typically small, hence the user must locate the devices to a specific area.

As will be understood by a person having ordinary skill in the art, chargeable devices may require a steady level of power to be adequately charged. For example, to conform to high power USB specifications, a power source should supply a steady source of 5 volt power at 500 milliamps (2.5 watts) to a chargeable device to successfully begin, continue and accurately terminate a charge cycle upon a battery reaching a fully charged state. Conventionally, power adapters (e.g., AC or DC) have been used to provide this steady source of power. As will also be understood by a person having ordinary skill in the art, wireless chargers may not be configured to supply adequate power levels and, furthermore, may periodically interrupt power to a chargeable device to "power share" among more than one chargeable device. This may lead to a failure to initiate a charge, early termination of charge and/or inaccurate battery state-of-charge measurements. A need exists for devices, systems and methods for supplying a steady level of power to a chargeable electronic device for adequate charging thereof.

DETAILED DESCRIPTION

The detailed description set forth below in connection with the appended drawings is intended as a description of exemplary embodiments of the present invention and is not intended to represent the only embodiments in which the present invention can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. It will be apparent to those skilled in the art that the exemplary embodiments of the invention may be practiced without these specific details. In some instances, well-known structures and devices are shown in block diagram form in order to avoid obscuring the novelty of the exemplary embodiments presented herein.

The words "wireless power" is used herein to mean any form of energy associated with electric fields, magnetic fields, electromagnetic fields, or otherwise that is transmitted between a transmitter and a receiver without the use of physical electromagnetic conductors.

Figure 1:
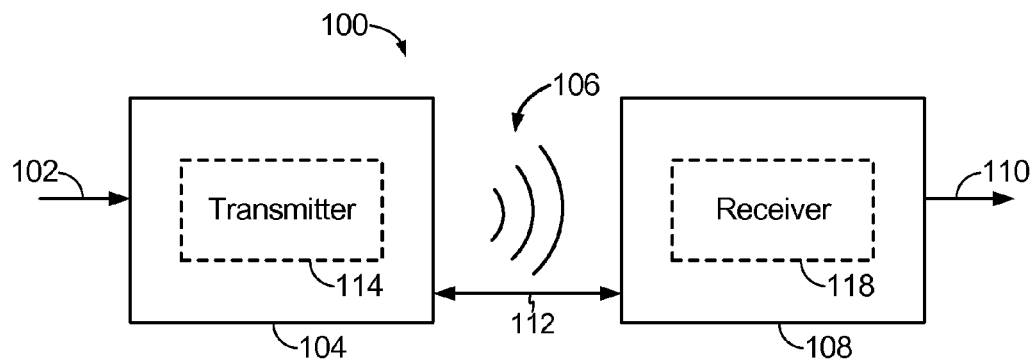
FIG. 1 shows a simplified block diagram of a wireless power transfer system.

FIG. 1 illustrates a wireless transmission or charging system 100, in accordance with various exemplary embodiments of the present invention. Input power 102 is provided to a transmitter 104 for generating a radiated field 106 for providing energy transfer. A receiver 108 couples to the radiated field 106 and generates an output power 110 for storing or consumption by a device (not shown) coupled to the output power 110. Both the transmitter 104 and the receiver 108 are separated by a distance 112. In one exemplary embodiment, transmitter 104 and receiver 108 are configured according to a mutual resonant relationship and when the resonant frequency of receiver 108 and the resonant frequency of transmitter 104 are very close, transmission losses between the transmitter 104 and the receiver 108 are minimal when the receiver 108 is located in the "near-field" of the radiated field 106.

Transmitter 104 further includes a transmit antenna 114 for providing a means for energy transmission and receiver 108 further includes a receive antenna 118 for providing a means for energy reception. The transmit and receive antennas are sized according to applications and devices to be associated therewith. As stated, an efficient energy transfer occurs by coupling a large portion of the energy in the near-field of the transmitting antenna to a receiving antenna rather than propagating most of the energy in an electromagnetic wave to the far field. When in this near-field a coupling mode may be developed between the transmit antenna 114 and the receive antenna 118. The area around the antennas 114 and 118 where this near-field coupling may occur is referred to herein as a coupling-mode region.

Figure 2:
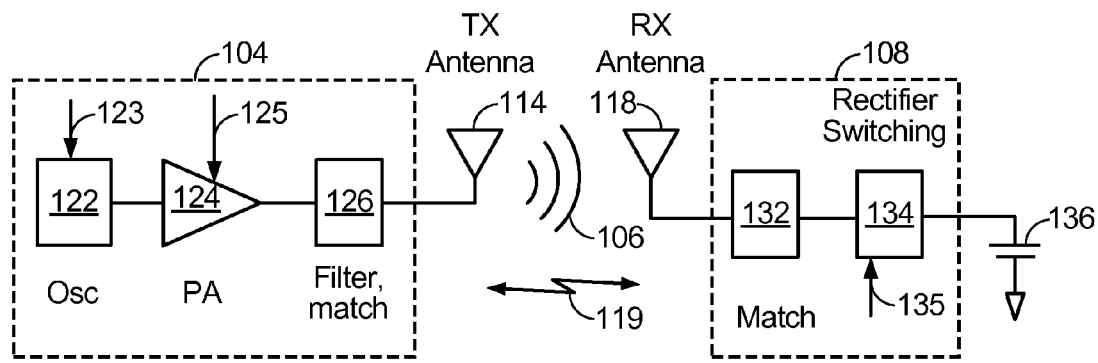
FIG. 2 shows a simplified schematic diagram of a wireless power transfer system.

FIG. 2 shows a simplified schematic diagram of a wireless power transfer system. The transmitter 104 includes an oscillator 122, a power amplifier 124 and a filter and matching circuit 126. The oscillator is configured to generate a signal at a desired frequency, which may be adjusted in response to adjustment signal 123. The oscillator signal may be amplified by the power amplifier 124 with an amplification amount responsive to control signal 125. The filter and matching circuit 126 may be included to filter out harmonics or other unwanted frequencies and match the impedance of the transmitter 104 to the transmit antenna 114.

The receiver 108 may include a matching circuit 132 and a rectifier and switching circuit 134 to generate a DC power output to charge a battery 136 as shown in FIG. 2 or power a device coupled to the receiver (not shown). The matching circuit 132 may be included to match the impedance of the receiver 108 to the receive antenna 118. The receiver 108 and transmitter 104 may communicate on a separate communication channel 119 (e.g., Bluetooth, zigbee, cellular, etc).

Figure 3:
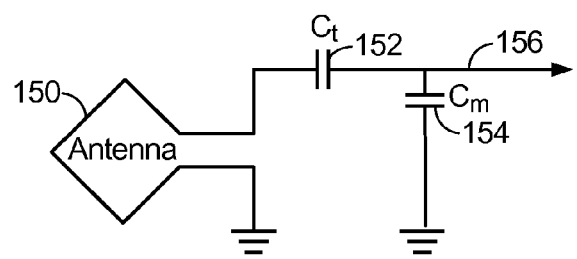
FIG. 3 shows a schematic diagram of a loop antenna for use in exemplary embodiments of the present invention.

As illustrated in FIG. 3, antennas used in exemplary embodiments may be configured as a "loop" antenna 150, which may also be referred to herein as a "magnetic" antenna. Loop antennas may be configured to include an air core or a physical core such as a ferrite core. Air core loop antennas may be more tolerable to extraneous physical devices placed in the vicinity of the core. Furthermore, an air core loop antenna allows the placement of other components within the core area. In addition, an air core loop may more readily enable placement of the receive antenna 118 (FIG. 2) within a plane of the transmit antenna 114 (FIG. 2) where the coupled-mode region of the transmit antenna 114 (FIG. 2) may be more powerful.

As stated, efficient transfer of energy between the transmitter 104 and receiver 108 occurs during matched or nearly matched resonance between the transmitter 104 and the receiver 108. However, even when resonance between the transmitter 104 and receiver 108 are not matched, energy may be transferred at a lower efficiency. Transfer of energy occurs by coupling energy from the near-field of the transmitting antenna to the receiving antenna residing in the neighborhood where this near-field is established rather than propagating the energy from the transmitting antenna into free space.

The resonant frequency of the loop or magnetic antennas is set by the inductance and capacitance of the resonant circuit. Inductance in a loop antenna is generally simply the inductance created by the loop, whereas, capacitance is generally added to the loop antenna's inductance to create a resonant structure at a desired resonant frequency. As a non-limiting example, capacitor 152 and capacitor 154 may be added to the antenna to create a resonant circuit that generates resonant signal 156. Accordingly, for larger diameter loop antennas, the size of capacitance needed to induce resonance decreases as the diameter or inductance of the loop increases. Furthermore, as the diameter of the loop or magnetic antenna increases, the efficient energy transfer area of the near-field increases. Of course, other resonant circuits are possible. As another non-limiting example, a capacitor may be placed in parallel between the two terminals of the loop antenna. In addition, those of ordinary skill in the art will recognize that for transmit antennas the resonant signal 156 may be an input to the loop antenna 150.

Exemplary embodiments of the invention include coupling power between two antennas that are in the near-fields of each other. As stated, the near-field is an area around the antenna in which electromagnetic fields exist but may not propagate or radiate away from the antenna. They are typically confined to a volume that is near the physical volume of the antenna. In the exemplary embodiments of the invention, magnetic type antennas such as single and multi-turn loop antennas are used for both transmit (Tx) and receive (Rx) antenna systems since magnetic near-field amplitudes tend to be higher for magnetic type antennas in comparison to the electric near-fields of an electric-type antenna (e.g., a small dipole). This allows for potentially higher coupling between the pair. Furthermore, "electric" antennas (e.g., dipoles and monopoles) or a combination of magnetic and electric antennas is also contemplated.

The Tx antenna can be operated at a frequency that is low enough and with an antenna size that is large enough to achieve good coupling (e.g., >−4 dB) to a small Rx antenna at significantly larger distances than allowed by far field and inductive approaches mentioned earlier. If the Tx antenna is sized correctly, high coupling levels (e.g., −2 to −4 dB) can be achieved when the Rx antenna on a host device is placed within a coupling-mode region (i.e., in the near-field) of the driven Tx loop antenna. It is noted that although FIG. 3 illustrates a single ended topology, a differential antenna topology is within the scope of the invention.

Figure 4:
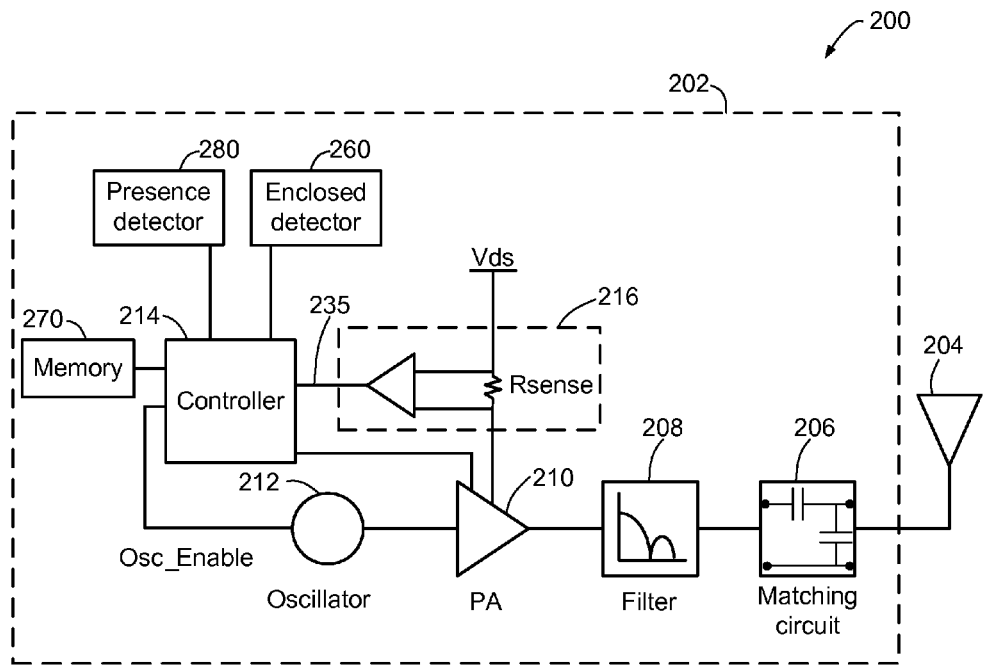
FIG. 4 is a simplified block diagram of a transmitter, in accordance with an exemplary embodiment of the present invention.

FIG. 4 is a simplified block diagram of a transmitter 200, in accordance with an exemplary embodiment of the present invention. The transmitter 200 includes transmit circuitry 202 and a transmit antenna 204. Generally, transmit circuitry 202 provides RF power to the transmit antenna 204 by providing an oscillating signal resulting in generation of near-field energy about the transmit antenna 204. By way of example, transmitter 200 may operate at the 13.56 MHz ISM band.

Exemplary transmit circuitry 202 includes a fixed impedance matching circuit 206 for matching the impedance of the transmit circuitry 202 (e.g., 50 ohms) to the transmit antenna 204 and a low pass filter (LPF) 208 configured to reduce harmonic emissions to levels to prevent self-jamming of devices coupled to receivers 108 (FIG. 1). Other exemplary embodiments may include different filter topologies, including but not limited to, notch filters that attenuate specific frequencies while passing others and may include an adaptive impedance match, that can be varied based on measurable transmit metrics, such as output power to the antenna or DC current draw by the power amplifier. Transmit circuitry 202 further includes a power amplifier 210 configured to drive an RF signal as determined by an oscillator 212. The transmit circuitry may be comprised of discrete devices or circuits, or alternately, may be comprised of an integrated assembly. An exemplary RF power output from transmit antenna 204 may be on the order of 2.5 Watts.

Transmit circuitry 202 further includes a controller 214 for enabling the oscillator 212 during transmit phases (or duty cycles) for specific receivers, for adjusting the frequency of the oscillator, and for adjusting the output power level for implementing a communication protocol for interacting with neighboring devices through their attached receivers.

The transmit circuitry 202 may further include a load sensing circuit 216 for detecting the presence or absence of active receivers in the vicinity of the near-field generated by transmit antenna 204. By way of example, a load sensing circuit 216 monitors the current flowing to the power amplifier 210, which is affected by the presence or absence of active receivers in the vicinity of the near-field generated by transmit antenna 204. Detection of changes to the loading on the power amplifier 210 are monitored by controller 214 for use in determining whether to enable the oscillator 212 for transmitting energy to communicate with an active receiver.

Transmit antenna 204 may be implemented as an antenna strip with the thickness, width and metal type selected to keep resistive losses low. In a conventional implementation, the transmit antenna 204 can generally be configured for association with a larger structure such as a table, mat, lamp or other less portable configuration. Accordingly, the transmit antenna 204 generally will not need "turns" in order to be of a practical dimension. An exemplary implementation of a transmit antenna 204 may be "electrically small" (i.e., fraction of the wavelength) and tuned to resonate at lower usable frequencies by using capacitors to define the resonant frequency. In an exemplary application where the transmit antenna 204 may be larger in diameter, or length of side if a square loop, (e.g., 0.50 meters) relative to the receive antenna, the transmit antenna 204 will not necessarily need a large number of turns to obtain a reasonable capacitance.

The transmitter 200 may gather and track information about the whereabouts and status of receiver devices that may be associated with the transmitter 200. Thus, the transmitter circuitry 202 may include a presence detector 280, an enclosed detector 260, or a combination thereof, connected to the controller 214 (also referred to as a processor herein). The controller 214 may adjust an amount of power delivered by the amplifier 210 in response to presence signals from the presence detector 280 and the enclosed detector 260. The transmitter may receive power through a number of power sources, such as, for example, an AC-DC converter (not shown) to convert conventional AC power present in a building, a DC-DC converter (not shown) to convert a conventional DC power source to a voltage suitable for the transmitter 200, or directly from a conventional DC power source (not shown).

As a non-limiting example, the presence detector 280 may be a motion detector utilized to sense the initial presence of a device to be charged that is inserted into the coverage area of the transmitter. After detection, the transmitter may be turned on and the RF power received by the device may be used to toggle a switch on the Rx device in a pre-determined manner, which in turn results in changes to the driving point impedance of the transmitter.

As another non-limiting example, the presence detector 280 may be a detector capable of detecting a human, for example, by infrared detection, motion detection, or other suitable means. In some exemplary embodiments, there may be regulations limiting the amount of power that a transmit antenna may transmit at a specific frequency. In some cases, these regulations are meant to protect humans from electromagnetic radiation. However, there may be environments where transmit antennas are placed in areas not occupied by humans, or occupied infrequently by humans, such as, for example, garages, factory floors, shops, and the like. If these environments are free from humans, it may be permissible to increase the power output of the transmit antennas above the normal power restrictions regulations. In other words, the controller 214 may adjust the power output of the transmit antenna 204 to a regulatory level or lower in response to human presence and adjust the power output of the transmit antenna 204 to a level above the regulatory level when a human is outside a regulatory distance from the electromagnetic field of the transmit antenna 204.

As a non-limiting example, the enclosed detector 260 (may also be referred to herein as an enclosed compartment detector or an enclosed space detector) may be a device such as a sense switch for determining when an enclosure is in a closed or open state. When a transmitter is in an enclosure that is in an enclosed state, a power level of the transmitter may be increased.

In exemplary embodiments, a method by which the transmitter 200 does not remain on indefinitely may be used. In this case, the transmitter 200 may be programmed to shut off after a user-determined amount of time. This feature prevents the transmitter 200, notably the power amplifier 210, from running long after the wireless devices in its perimeter are fully charged. This event may be due to the failure of the circuit to detect the signal sent from the receive coil that a device is fully charged. To prevent the transmitter 200 from automatically shutting down if another device is placed in its perimeter, the transmitter 200 automatic shut off feature may be activated only after a set period of lack of motion detected in its perimeter. The user may be able to determine the inactivity time interval, and change it as desired. As a non-limiting example, the time interval may be longer than that needed to fully charge a specific type of wireless device under the assumption of the device being initially fully discharged.

Figure 5:
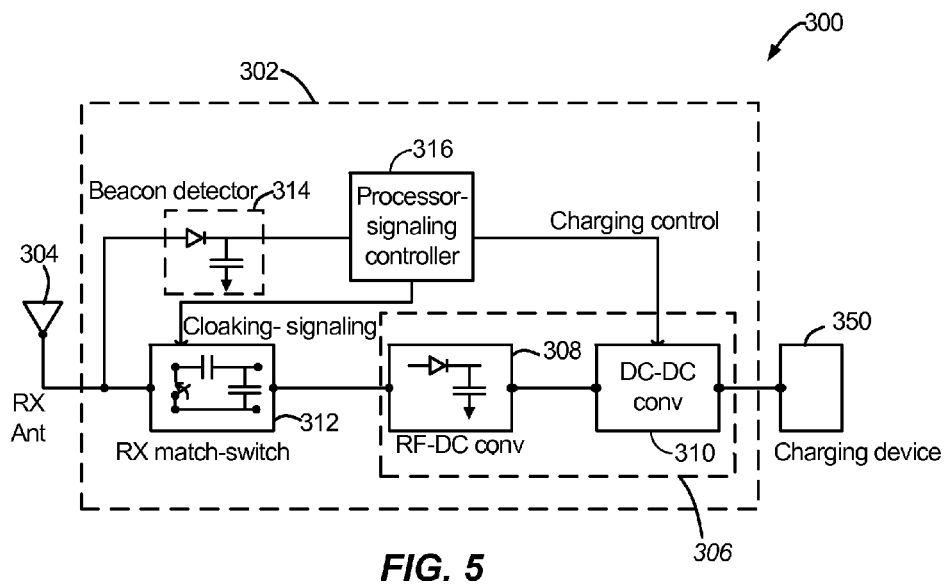
FIG. 5 is a simplified block diagram of a receiver, in accordance with an exemplary embodiment of the present invention.

FIG. 5 is a simplified block diagram of a receiver 300, in accordance with an exemplary embodiment of the present invention. The receiver 300 includes receive circuitry 302 and a receive antenna 304. Receiver 300 further couples to device 350 for providing received power thereto. It should be noted that receiver 300 is illustrated as being external to device 350 but may be integrated into device 350. Generally, energy is propagated wirelessly to receive antenna 304 and then coupled through receive circuitry 302 to device 350.

Receive antenna 304 is tuned to resonate at the same frequency, or near the same frequency, as transmit antenna 204 (FIG. 4). Receive antenna 304 may be similarly dimensioned with transmit antenna 204 or may be differently sized based upon the dimensions of the associated device 350. By way of example, device 350 may be a portable electronic device having diametric or length dimension smaller that the diameter or length of transmit antenna 204. In such an example, receive antenna 304 may be implemented as a multi-turn antenna in order to reduce the capacitance value of a tuning capacitor (not shown) and increase the receive antenna's impedance. By way of example, receive antenna 304 may be placed around the substantial circumference of device 350 in order to maximize the antenna diameter and reduce the number of loop turns (i.e., windings) of the receive antenna and the inter-winding capacitance.

Receive circuitry 302 provides an impedance match to the receive antenna 304. Receive circuitry 302 includes power conversion circuitry 306 for converting a received RF energy source into charging power for use by device 350. Power conversion circuitry 306 includes an RF-to-DC converter 308 and may also in include a DC-to-DC converter 310. RF-to-DC converter 308 rectifies the RF energy signal received at receive antenna 304 into a non-alternating power while DC-to-DC converter 310 converts the rectified RF energy signal into an energy potential (e.g., voltage) that is compatible with device 350. Various RF-to-DC converters are contemplated, including partial and full rectifiers, regulators, bridges, doublers, as well as linear and switching converters.

Receive circuitry 302 may further include switching circuitry 312 for connecting receive antenna 304 to the power conversion circuitry 306 or alternatively for disconnecting the power conversion circuitry 306. Disconnecting receive antenna 304 from power conversion circuitry 306 not only suspends charging of device 350, but also changes the "load" as "seen" by the transmitter 200 (FIG. 2).

As disclosed above, transmitter 200 includes load sensing circuit 216 which detects fluctuations in the bias current provided to transmitter power amplifier 210. Accordingly, transmitter 200 has a mechanism for determining when receivers are present in the transmitter's near-field.

When multiple receivers 300 are present in a transmitter's near-field, it may be desirable to time-multiplex the loading and unloading of one or more receivers to enable other receivers to more efficiently couple to the transmitter. A receiver may also be cloaked in order to eliminate coupling to other nearby receivers or to reduce loading on nearby transmitters. This "unloading" of a receiver is also known herein as a "cloaking." Furthermore, this switching between unloading and loading controlled by receiver 300 and detected by transmitter 200 provides a communication mechanism from receiver 300 to transmitter 200 as is explained more fully below. Additionally, a protocol can be associated with the switching which enables the sending of a message from receiver 300 to transmitter 200. By way of example, a switching speed may be on the order of 100 μsec.

In an exemplary embodiment, communication between the transmitter and the receiver refers to a device sensing and charging control mechanism, rather than conventional two-way communication. In other words, the transmitter uses on/off keying or amplitude modulation of the transmitted signal to adjust whether energy is available in the near-filed. The receivers interpret these changes in energy as a message from the transmitter. From the receiver side, the receiver uses tuning and de-tuning of the receive antenna to adjust how much power is being accepted from the near-field. The transmitter can detect this difference in power used from the near-field and interpret these changes as a message from the receiver.

Receive circuitry 302 may further include signaling detector and beacon circuitry 314 used to identify received power changes, which may correspond to informational signaling from the transmitter to the receiver. Furthermore, signaling and beacon circuitry 314 may also be used to detect the transmission of a reduced RF signal energy (i.e., a beacon signal) and to rectify the reduced RF signal energy into a nominal power for awakening either un-powered or power-depleted circuits within receive circuitry 302 in order to configure receive circuitry 302 for wireless charging.

Receive circuitry 302 further includes processor 316 for coordinating the processes of receiver 300 described herein including the control of switching circuitry 312 described herein. Cloaking of receiver 300 may also occur upon the occurrence of other events including detection of an external wired charging source (e.g., wall/USB power) providing charging power to device 350. Processor 316, in addition to controlling the cloaking of the receiver, may also monitor beacon circuitry 314 to determine a beacon state and extract messages sent from the transmitter. Processor 316 may also adjust DC-to-DC converter 310 for improved performance.

Figure 6:
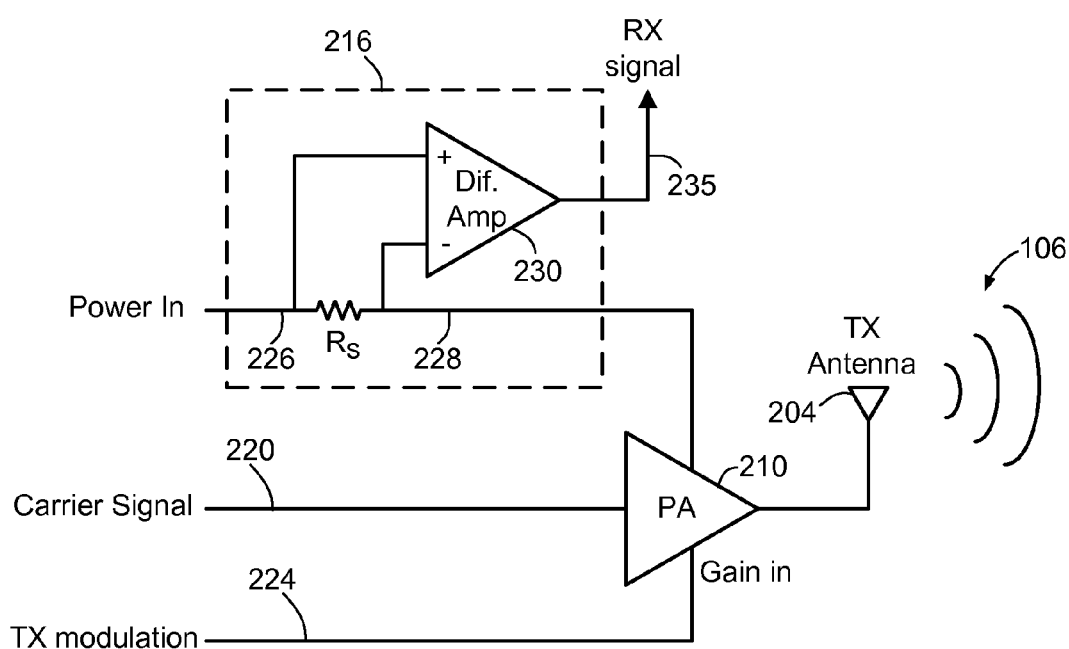
FIG. 6 shows a simplified schematic of a portion of transmit circuitry for carrying out messaging between a transmitter and a receiver.

FIG. 6 shows a simplified schematic of a portion of transmit circuitry for carrying out messaging between a transmitter and a receiver. In some exemplary embodiments of the present invention, a means for communication may be enabled between the transmitter and the receiver. In FIG. 6 a power amplifier 210 drives the transmit antenna 204 to generate the radiated field. The power amplifier is driven by a carrier signal 220 that is oscillating at a desired frequency for the transmit antenna 204. A transmit modulation signal 224 is used to control the output of the power amplifier 210.

The transmit circuitry can send signals to receivers by using an ON/OFF keying or amplitude modulation process on the power amplifier 210. In other words, when the transmit modulation signal 224 is at a higher level, the power amplifier 210 will drive the frequency of the carrier signal 220 out on the transmit antenna 204 at a higher power level. When the transmit modulation signal 224 is at a lower power level, the power amplifier will not drive out any frequency on the transmit antenna 204 at a lower power level.

The transmit circuitry of FIG. 6 also includes a load sensing circuit 216 that supplies power to the power amplifier 210 and generates a receive signal 235 output. In the load sensing circuit 216 a voltage drop across resistor $R_s$ develops between the power in signal 226 and the power supply 228 to the power amplifier 210. Any change in the power consumed by the power amplifier 210 will cause a change in the voltage drop that will be amplified by differential amplifier 230. When the transmit antenna is in coupled mode with a receive antenna in a receiver (not shown in FIG. 6) the amount of current drawn by the power amplifier 210 will change. In other words, if no coupled mode resonance exist for the transmit antenna 204, the power required to drive the radiated field will be a first amount. If a coupled mode resonance exists, the amount of power consumed by the power amplifier 210 will go up because much of the power is being coupled into the receive antenna. Thus, the receive signal 235 can indicate the presence of a receive antenna coupled to the transmit antenna 235 and can also detect signals sent from the receive antenna. Additionally, a change in receiver current draw will be observable in the transmitter's power amplifier current draw, and this change can be used to detect signals from the receive antennas.

As will be understood by one having ordinary skill in the art, chargeable electronic devices (e.g., a mobile telephone) may be configured for periodic charging (i.e., receiving a charge for several minutes at a time). However, as noted above, wireless chargers may periodically interrupt power to a chargeable electronic device to "power share" among more than one chargeable electronic device and, therefore, may convey power to the chargeable electronic device for only a few seconds, or less, at a time. This may lead to a failure to initiate a charge, early termination of charge and/or inaccurate battery state-of-charge measurements.

Figure 7:
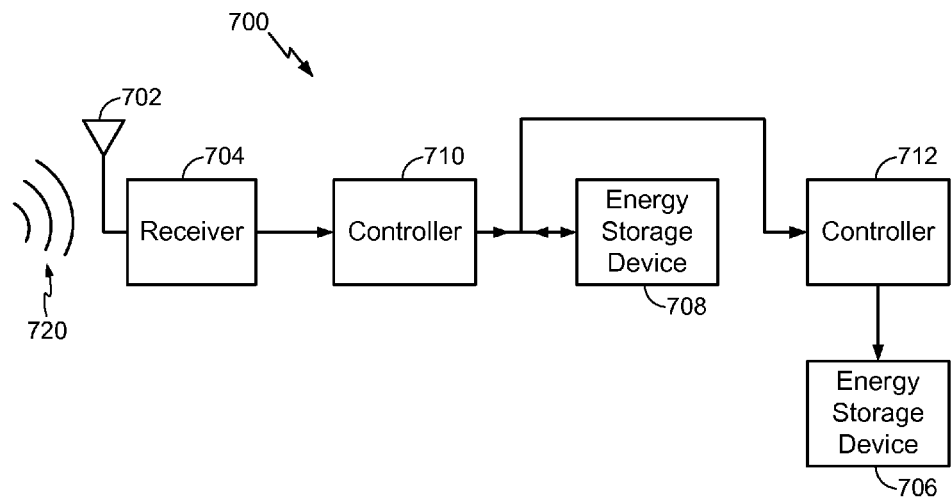
FIG. 7 illustrates a block diagram of a portion of an electronic device, according to an exemplary embodiment of the present invention.

Exemplary embodiments of the invention, as described herein, are directed to devices, systems and methods for supplying a steady level of power to a chargeable electronic device for adequate charging thereof. FIG. 7 depicts a block diagram of a portion of an electronic device 700, in accordance with an exemplary embodiment of the present invention. According to one exemplary embodiment, electronic device 700 may comprise a chargeable device, such as, for example only, a cellular telephone, a portable media player, a camera, a gaming device, a navigation device, a headset (e.g., a Bluetooth headset), a tool, a toy, or any combination thereof. According to another exemplary embodiment, as described more fully below, electronic device 700 may comprise a device configured to house a chargeable device. More specifically, in this exemplary embodiment, electronic device 700 may comprise a sleeve, a shell, a cage, a case, a cover, or any combination thereof.

Electronic device 700 may be configured to wirelessly receive power transmitted from another electronic device, such as a wireless charger. More specifically, electronic device 700 may include an antenna 702 operably coupled to a receiver 704 and configured for receiving an RF field 720, which may comprise wireless power. Additionally, electronic device 700 may be configured to convey power to an energy storage device 706, which may be internal to or external to electronic device 700. Electronic device 700 may further include a first energy storage device 708, which may comprise any known and suitable device configured to receive, store, and convey energy. First energy storage device 708 may also be referred to herein as an "accumulator 708." As non-limiting examples, accumulator 708 may comprise a battery, an ultracapacitor, a mechanical storage device, or any combination thereof. According to one exemplary embodiment, to enhance efficiency, accumulator 708 may be configured to operate at a voltage substantially equal to or greater than a voltage at which electronic device 700 operates.

Electronic device 700 may also include a controller 710, which is operably coupled to each of receiver 704 and accumulator 708, and a controller 712, which is operably coupled to each of controller 710, accumulator 708, and energy storage device 706. Controller 710 may be configured to receive energy from receiver 704 and convey energy to accumulator 708. Controller 712 may be configured to receive energy from each of controller 710 and accumulator 708 and transfer energy to energy storage device 706. Although controller 710 and controller 712 are illustrated as separate devices, the functionality of controller 710 and controller 712 may be implemented within a single controller.

According to one exemplary embodiment, as a voltage level and/or a current level at the input of controller 712 reaches a threshold level, energy may transferred from accumulator 708, and possibly receiver 704, to energy storage device 706, via controller 712. Stated another way, upon a charging level of accumulator 708 reaching a threshold value, second controller 712 may be configured to transfer energy from accumulator 708, and possibly receiver 704, to energy storage device 706. It is noted that if an amount of energy available from accumulator 708 and receiver 704 becomes insufficient to charge energy storage device 706 (i.e., the charging level of accumulator 708 drops below a threshold value), charging of energy storage device 706 may cease, and accumulator 708 may be recharged. When the energy available from accumulator 708, receiver 704, or a combination thereof, again becomes sufficient to charge energy storage device 706, controller 712 may convey energy to energy storage device 706. It is further noted that because energy is only transferred to energy storage device 706 if accumulator 708 comprises at least a threshold level of charge, energy storage device 706 never receives less than a certain amount of energy while being charged.

As described above, electronic device 700 may be configured to transfer energy to energy storage device 706 upon a charging level of accumulator 708 reaching a threshold value. Furthermore, according to one exemplary embodiment, and, as described more fully below with reference to FIG. 16, transfer of energy from accumulator 708 to energy storage device 706 may cease upon the charging level of accumulator 708 dropping below the threshold value. According to another exemplary embodiment, which is described more fully below with reference to FIG. 17, transfer of energy from accumulator 708 to energy storage device 706 may cease upon the charging level of accumulator 708 dropping below a second threshold value, which is lower than the threshold value required to initiate transfer of energy from accumulator 708 to energy storage device 706.

A contemplated operation of electronic device 700 will now be described.

Initially, antenna 702 may receive a signal, which, according to this example, comprises wireless power. Thereafter, the wireless power signal may be received by receiver 704, which may function in a manner similar to receiver 302, as described above with reference to FIG. 5. Receiver 704 may then convey energy to accumulator 708, via controller 710, for charging thereof. Upon a charging level of accumulator 708 reaching a threshold value, energy may be transferred from accumulator 708, receiver 704, or a combination thereof to energy storage device 706 via controller 712. At any time in which the voltage level of accumulator 708 drops below either the threshold value or another, lower threshold value, power transmission from accumulator 708 to energy storage device 706 may be terminated.

Figure 8:
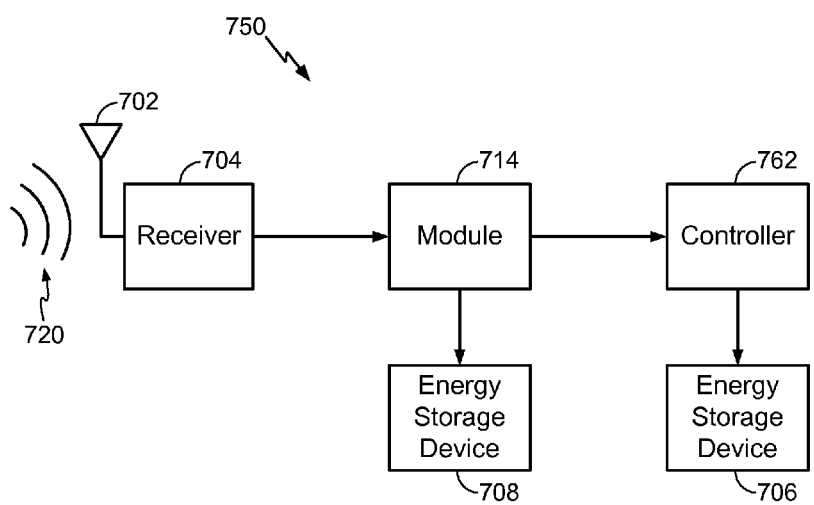
FIG. 8 illustrates a block diagram of a portion of another electronic device, according to an exemplary embodiment of the present invention.

FIG. 8 depicts a block diagram of a portion of another electronic device 750, according to an exemplary embodiment of the present invention. Similarly to electronic device 700, in one exemplary embodiment, electronic device 750 may comprise a chargeable device, such as, for example only, a cellular telephone, a portable media player, a camera, a gaming device, a navigation device, a headset (e.g., a Bluetooth headset), a tool, a toy, or any combination thereof. According to another exemplary embodiment, electronic device 750 may comprise a device configured to house a chargeable device such as, for example only, a sleeve, a shell, a cage, a case, a cover, or any combination thereof.

Electronic device 750 may be configured to wirelessly receive power transmitted from another electronic device, such as a wireless charger. More specifically, electronic device 750 may include antenna 702 operably coupled to receiver 704 and configured for receiving RF field 720, which may comprise wireless power. Additionally, electronic device 700 may be configured to convey power to energy storage device 706, which may be internal to or external to electronic device 750.

Electronic device 750 may further include energy storage device 708 (also referred to herein as "accumulator 708"), which, as noted above, may comprise any known and suitable device configured to receive, store, and convey energy. According to one exemplary embodiment, to enhance efficiency, accumulator 708 may be configured to operate at a voltage substantially equal to or greater than a voltage at which electronic device 750 operates.

Furthermore, electronic device 750 may include a power module 714 operably coupled to each of receiver 704, accumulator 708, and a controller 762. According to one exemplary embodiment, power module 714 may comprise a three-port module. Power module 714 may be configured to receive power from receiver 704 and convey power to accumulator 708. Moreover, controller 762 may be configured to receive power from power module 714 and convey power to energy storage device 706. According to one exemplary embodiment, power module 714 may be configured to control how much energy is conveyed from power module 714 to accumulator 708, how much energy is conveyed from accumulator 708 to power module 714, and how much energy is conveyed from power module 714 to controller 762.

According to one exemplary embodiment, as a voltage level and/or a current level at the input of controller 762 reaches a threshold level, energy may transferred from accumulator 708, and possibly receiver 704, to energy storage device 706, via controller 762. Stated another way, upon a charging level of accumulator 708 reaching a threshold value, power module 714 may be configured to transfer energy from accumulator 708, and possibly receiver 704, to energy storage device 706. It is noted that if an amount of energy available from accumulator 708 and receiver 704 becomes insufficient to charge energy storage device 706, charging of energy storage device 706 may cease, and accumulator 708 may be recharged. Furthermore, when the energy available from accumulator 708, receiver 704, or a combination thereof, again becomes sufficient to charge energy storage device 706, power module 714 may convey power to energy storage device 706 via controller 762. As noted above with respect to electronic device 700, because energy is only transferred to energy storage device 706 if accumulator 708 comprises a threshold level of charge, energy storage device 706 never receive less than a certain amount of energy while being charged.

As described above, electronic device 750 may be configured to transfer energy to energy storage device 706 upon a charging level of accumulator 708 reaching a threshold value. Furthermore, according to one exemplary embodiment and, as described more fully below with reference to FIG. 16, transfer of energy from accumulator 708 to energy storage device 706 may cease upon the charging level of accumulator 708 dropping below the threshold value. According to another exemplary embodiment as described more fully below with reference to FIG. 17, transfer of energy from accumulator 708 to energy storage device 706 may cease upon the charging level of accumulator 708 dropping below a second threshold value, which is lower than the threshold value required to initiate transfer of energy from accumulator 708 to energy storage device 706.

A contemplated operation of electronic device 750 will now be described.

Initially, antenna 702 may receive a signal, which, according to this example, comprises wireless power. Thereafter, the wireless power signal may be received by receiver 704, which may function in a manner similar to receiver 302, as described above with reference to FIG. 5. Receiver 704 may then convey power to accumulator 708, via power module 714, for charging thereof. Upon a voltage level of an input of controller 712 reaching a threshold value, power may be transferred from accumulator 708, receiver 704, or a combination thereof to energy storage device 706 via controller 762. At any time in which the voltage level of accumulator 708 drops below either the threshold value or another, lower threshold value, power transmission from accumulator 708 to energy storage device 706 may cease.

As noted above, power module 714 may be configured to control how much energy is conveyed to and from accumulator 708 and how much energy is conveyed to energy storage device 706 via controller 762. As an example, power module 714 may be configured to convey a certain percentage (e.g., 25%) of energy received from receiver 704 to accumulator 708 and a certain percentage (e.g., 75%) of energy received from receiver 704 to energy storage device 706, via controller 762.

Figure 9:
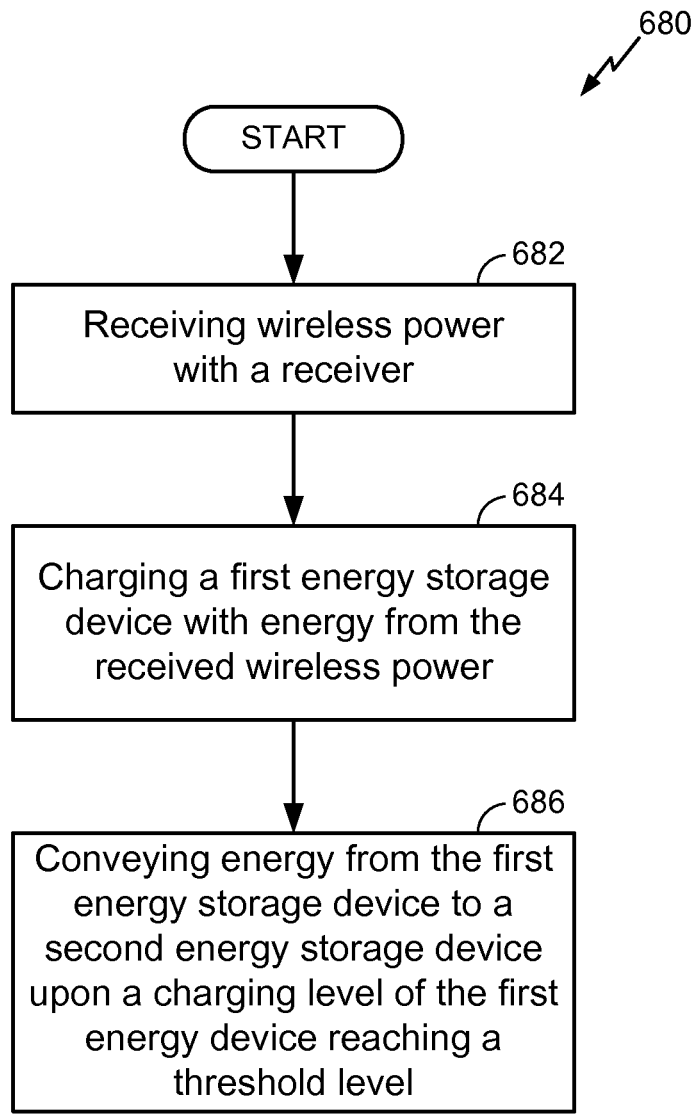
FIG. 9 is a flowchart illustrating a method, in accordance with an exemplary embodiment of the present invention.

FIG. 9 is a flowchart illustrating a method 680, in accordance with one or more exemplary embodiments. Method 680 may include receiving wireless power with a receiver (depicted by numeral 682). Method 680 may further include charging a first energy storage device with energy from the received wireless power (depicted by numeral 684). Further, method 680 may include conveying energy from the first energy storage device to a second energy storage device upon a charging level of the first energy storage device reaching a threshold level (depicted by numeral 686).

Figure 10:
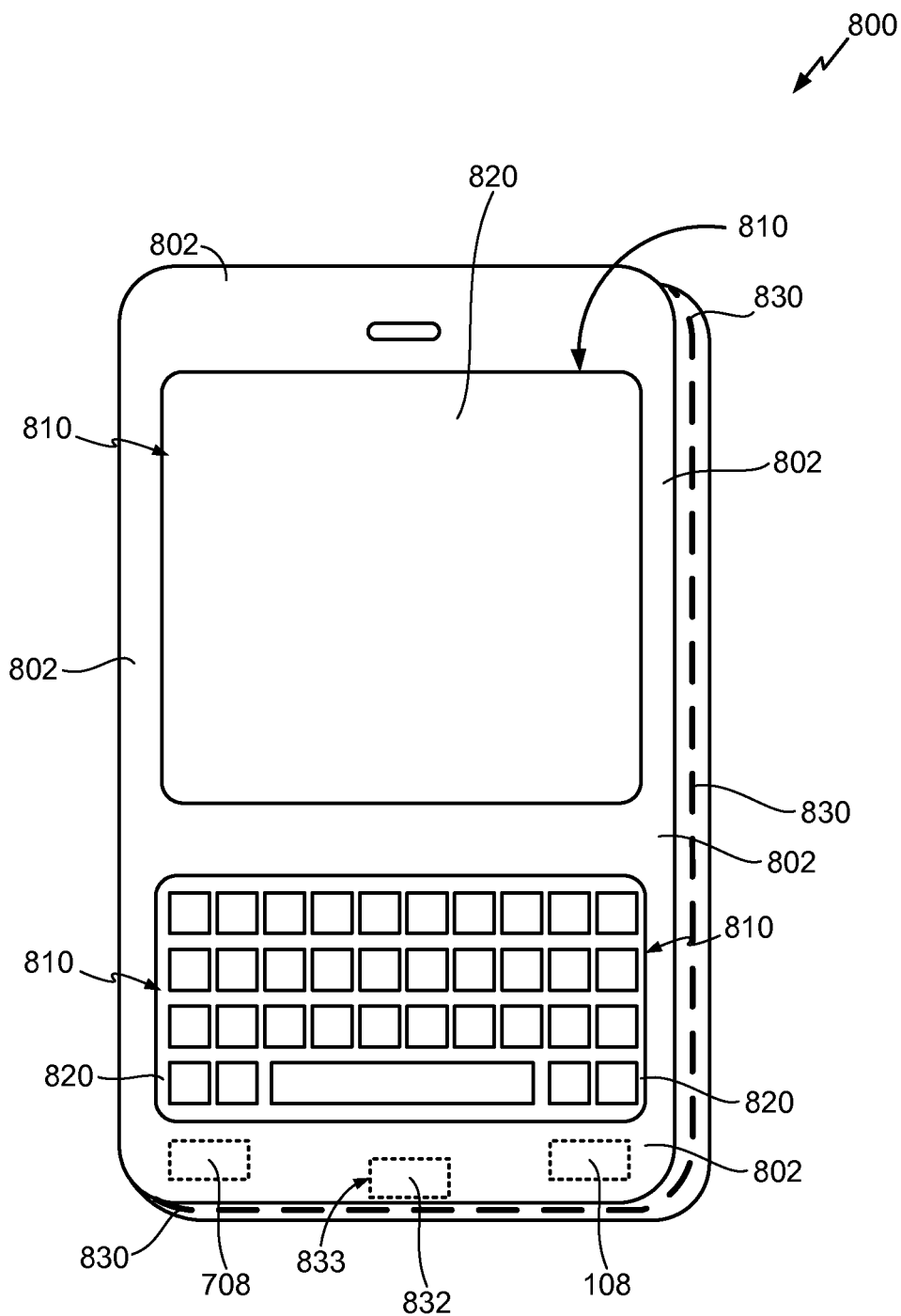
FIG. 10 depicts a device, in accordance with an exemplary embodiment of the present invention.

FIG. 10 depicts a device 800 in accordance with an exemplary embodiment of the present invention. Device 800 includes a housing 802 (e.g., a sleeve, a case, or a cage) configured to receive an electronic device, such as electronic device 820. Furthermore, device 800 may include a receiver 108 (e.g., receiver 108 of FIG. 2) and an associated receive antenna 830 coupled to housing 802. According to one exemplary embodiment, the receiver 108 (e.g., receiver 108 of FIG. 2) and associated receive antenna 830 may be embedded within housing 802.

Housing 802 may configured and sized to accommodate electronic device 820, which may comprise, for example only, a cellular telephone, a portable media player, a camera, or any combination thereof. It is noted that housing 802 may comprise any known and suitable device configured to receive at least a portion of an electronic device. According to one exemplary embodiment, housing 802 may be configured to securely fit at least partially around an electronic device. Further, as will be understood by a person having ordinary skill in the art, housing 802 may comprise any known and suitable device used for protecting an electronic device, attaching an electronic device to a user (e.g., a user's belt), and the like. As non-limiting examples, housing 802 may comprise a sleeve, a shell, a cage, a case, a cover, or any combination thereof.

According to the embodiment illustrated in FIG. 10, housing 802 may be configured to enable a user to operate electronic device 820 while electronic device 820 is positioned within housing 802. Furthermore, housing 802 may include one or more access openings 810 configured to enable a device user to access one or more input or output devices of electronic device 820. For example, housing 802 may include one or more access openings 810 to enable a user to access a display panel, a connector, or any other peripherals (e.g., buttons) of an electronic device (e.g., electronic device 820) positioned within housing 802.

As described more fully below with reference to FIGS. 13 and 14, device 800 may further include an electrical connector 832 positioned within an opening 833 of housing 802 and configured to operably couple a port (e.g., a standard USB port used to couple the electronic device to a power outlet via a wired connection) of an electronic device (e.g., electronic device 820) positioned within housing 802 to a receiver (e.g., receiver 108) coupled to housing 802. According to an exemplary embodiment in which device 800 comprises either electronic device 700 or electronic device 750, device 800 may include electrical connector 832 positioned within an opening 833 of housing 802 and configured to operably couple a port of an electronic device (e.g., electronic device 820) positioned within housing 802 to a controller (e.g., controller 712 or controller 762) coupled to the device. Accordingly, device 800 may be configured to enable an electronic device (e.g., electronic device 820) to be charged while the electronic device is positioned within housing 802 and while the electronic device is being used.

Figure 11:
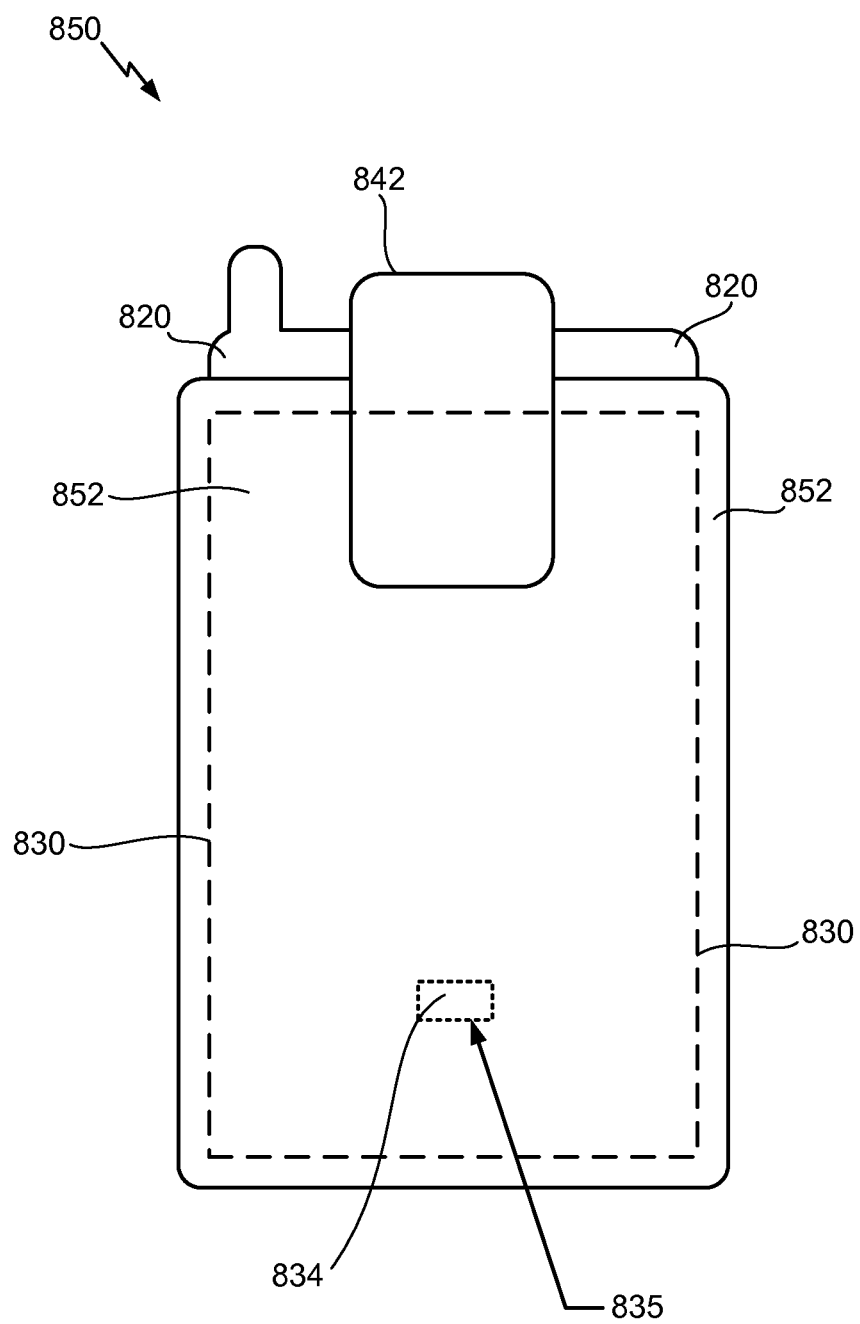
FIG. 11 depicts another device, in accordance with an exemplary embodiment of the present invention.

FIG. 11 is another device 850 having a housing 852 at least partially surrounding electronic device 820. Device 850 is similar to device 800 of FIG. 10 and, therefore, will not be explained in detail. However, it is noted that, according to the embodiment illustrated in FIG. 11, housing 852 may be configured in a manner such that a device user may be required to remove electronic device 820 from housing 852 before using electronic device 820. Device 850 may include a receiver (not shown in FIG. 11, see e.g., receiver 108 of FIG. 2) and associated receive antenna 830 coupled to housing 850. According to one exemplary embodiment, receiver 108 (see FIG. 2) and associated receive antenna 830 may be embedded within housing 852.

As described more fully below with reference to FIGS. 13 and 14, device 850 may further include an electrical connector 834 positioned within an opening 835 of housing 852 and configured to operably couple a port (e.g., a USB port) of an electronic device (e.g., electronic device 820) positioned within housing 852 to a receiver (e.g., receiver 108 of FIG. 2) coupled to housing 852. According to an exemplary embodiment in which device 800 comprises either electronic device 700 or electronic device 750, device 800 may include electrical connector 832 positioned within an opening 833 of housing 802 and configured to operably couple a port of an electronic device (e.g., electronic device 820) positioned within housing 802 to a controller (e.g., controller 712 or controller 762) coupled to the device. Additionally, housing 852 may include a detachable latch 842, which, while in a closed attached positioned, may be configured to securely retain an electronic device (e.g., electronic device 820) positioned within housing 852.

Figure 12:
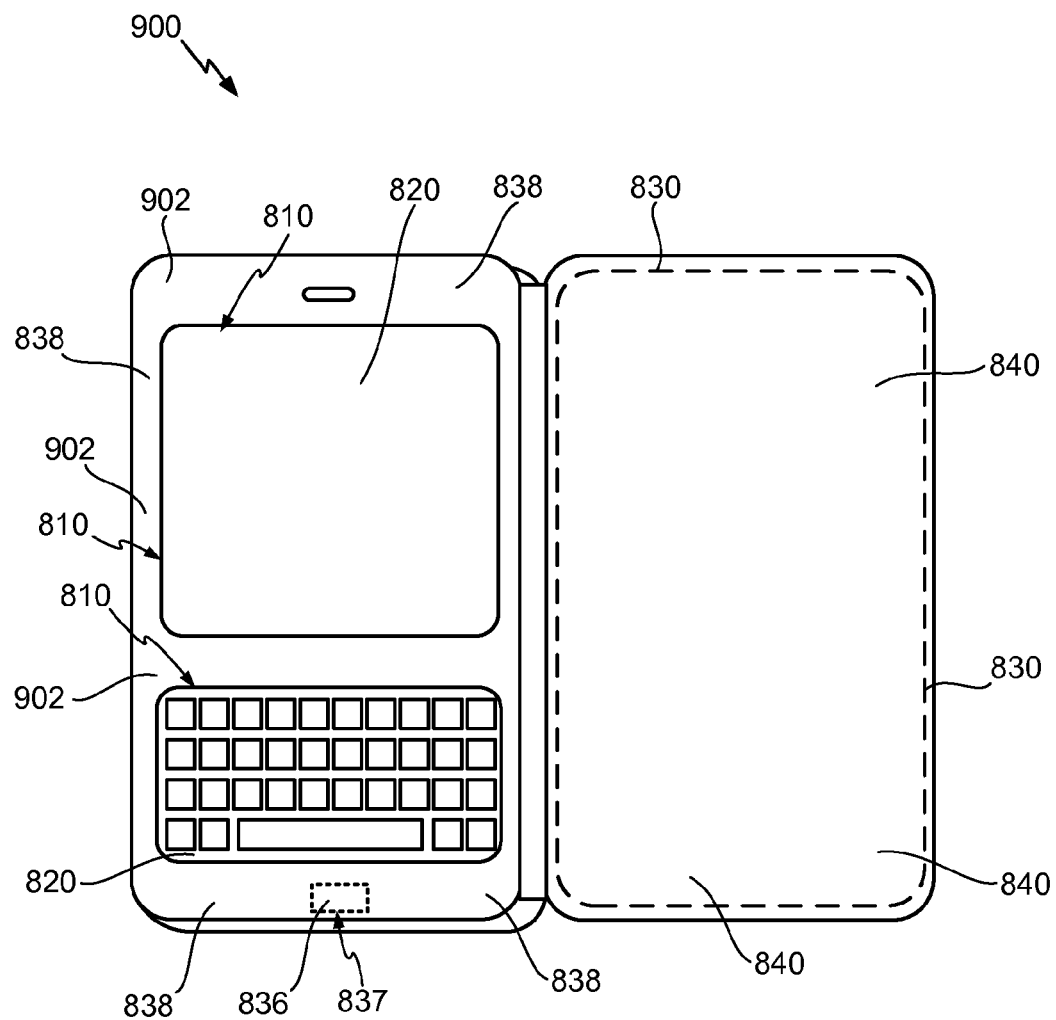
FIG. 12 depicts yet another device, according to an exemplary embodiment of the present invention.

FIG. 12 is another device 900 including housing 902 and antenna 830. Device 900 is similar to devices 800 and 850 of FIGS. 10 and 11, respectively, and, therefore, will not be explained in detail. However, it is noted that housing 902 includes a cover 840 having receive antenna 830 coupled thereto. For example only, receive antenna 830 may be embedded within cover 840. It is further noted that device 900 may include a receiver (e.g., receiver 108 of FIG. 2) coupled to a body 838 of housing 902. For example only, receiver 108 (see FIG. 2) may be embedded within body 838 of housing 902.

As described more fully below with reference to FIGS. 13 and 14, device 900 may further include an electrical connector 836 positioned within an opening 837 of housing 852 and configured to operably couple a port (e.g., a USB port) of an electronic device (e.g., electronic device 820) positioned within housing 902 to a receiver (e.g., receiver 108 of FIG. 2) coupled to housing 902. According to an exemplary embodiment in which device 800 comprises either electronic device 700 or electronic device 750, device 800 may include electrical connector 832 positioned within an opening 833 of housing 802 and configured to operably couple a port of an electronic device (e.g., electronic device 820) positioned within housing 802 to a controller (e.g., controller 712 or controller 762) coupled to the device. According to an exemplary embodiment, cover 840 may be placed in an "open" position, as illustrated in FIG. 12, prior to being placed on a charging surface. Accordingly, in comparison to an antenna positioned within body 838, antenna 830 may more efficiently receive wireless power as a result of less interference caused by metal within electronic device 820.

Figure 13:
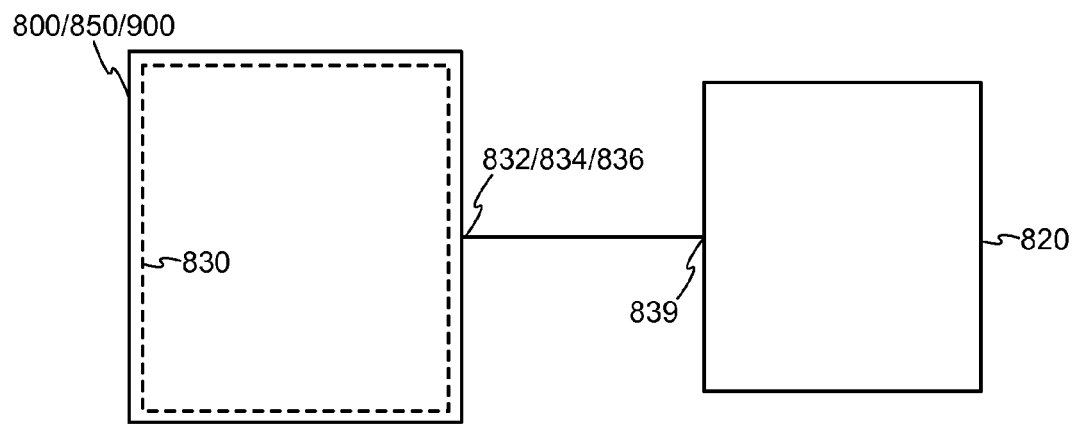
FIG. 13 illustrates the device of either FIG. 10, FIG. 11, or FIG. 12 coupled to an electronic device, according to an exemplary embodiment of the present invention.
Figure 14:
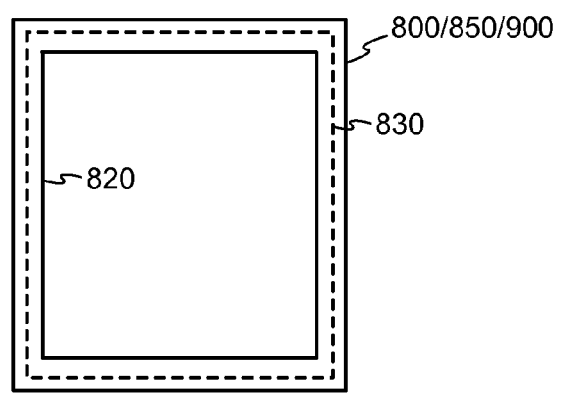
FIG. 14 illustrates an electronic device positioned within the device of either FIG. 10, FIG. 11, or FIG. 12, in accordance with an exemplary embodiment of the present invention.

With reference to FIGS. 13 and 14, a device, which may comprise device 800, device 850, or device 900, is illustrated. Device 800/850/900 may include electrical connector 832/834/836 configured to operably couple a port 839 (e.g., a USB port) of an electronic device (e.g., electronic device 820) to a receiver (e.g., receiver 108 of FIG. 2) coupled to associated receive antenna 830, which is coupled to housing of device 800/850/900. Specifically, FIG. 13 illustrates a physical, electrical connection between device 800/850/900 and electronic device 820 and FIG. 14 illustrates electronic device 820 positioned within device 800/850/900.

It is noted that in each of the exemplary embodiments illustrated in FIGS. 10-12, the described housings (i.e., housing 802, housing 852, and housing 902) are each physically larger than an electronic device positioned therein. Accordingly, an antenna coupled to the housing (e.g., antenna 830) may be physically larger than the electronic device positioned within the housing. As a result, in comparison to an antenna positioned within the electronic device, an antenna coupled to the housing may be physically larger and, therefore, a charging efficiency of the electronic device may be enhanced. Moreover, it is also noted that each of device 800, device 850, and device 900 may comprise either electronic device 700 or electronic device 750. Therefore, according to various exemplary embodiments, each of device 800, device 850, and device 900 may comprise an energy storage device (i.e., accumulator 708).

Figure 15:
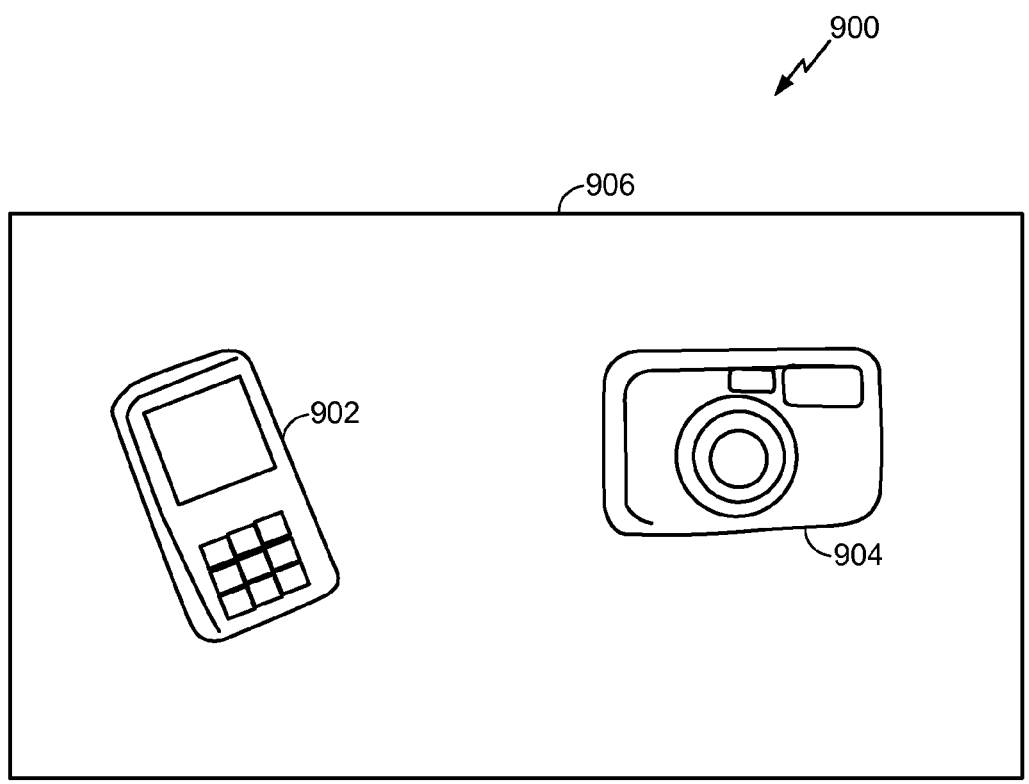
FIG. 15 illustrates a system including a first electronic device and a second electronic device positioned within a charging region of a wireless charger.

FIG. 15 illustrates a system 900 including a first electronic device 902 and a second electronic device 904, wherein each of first electronic device 902 and second electronic device 904 are positioned within a charging region of a wireless charger 906. It is noted that first electronic device 902 may comprise either electronic device 700 or electronic device 750, as described above. Furthermore, it is noted that first electronic device 902 may comprise a chargeable device (e.g., a camera, a mobile telephone, or a media player) or a device configured to house a chargeable device (e.g., a sleeve, a case, or a cage).

Figure 16:
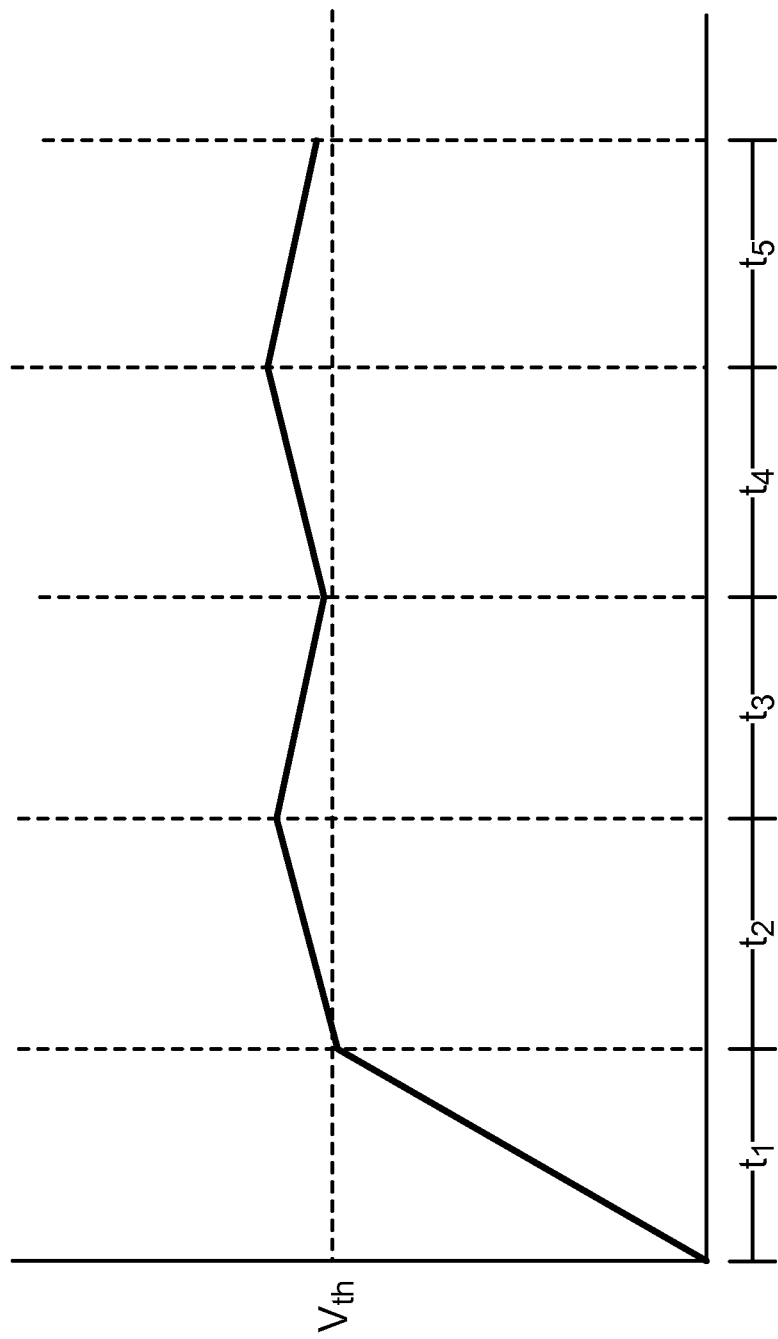
FIG. 16 illustrates a timing diagram, according to an exemplary embodiment of the present invention.

As will be understood by a person having ordinary skill in the art, wireless power chargers may convey wireless power to a plurality of electronic device according to a time domain multiplexing method based upon allocated activation time slots for each electronic device. FIG. 16 is a timing diagram illustrating an energy level of an energy storage device (e.g., accumulator 708) of first electronic device 902 over time, wherein wireless charger 906 is conveying wireless power to first electronic device 902 and second electronic device 904 according to a time domain multiplexing method. During a first time slot $t_1$, wireless charger 906 is conveying wireless power to first electronic device 902 and, as a result, an energy level of the accumulator increases and reaches a threshold value Vth. During each of time slots $t_2$ through $t_5$, energy is being conveyed from the accumulator to an energy storage device (e.g., energy storage device 706). Further, during a second time slot $t_2$ and a fourth time slot $t_4$, wireless charger 906 is conveying power to first electronic device 902. Moreover, during each of a third time slot $t_3$ and a fifth time slot $t_5$, wireless charger 906 is conveying power to second electronic device 904 and, therefore, a voltage level of the accumulator of first electronic device 902 is decreasing.

Figure 17:
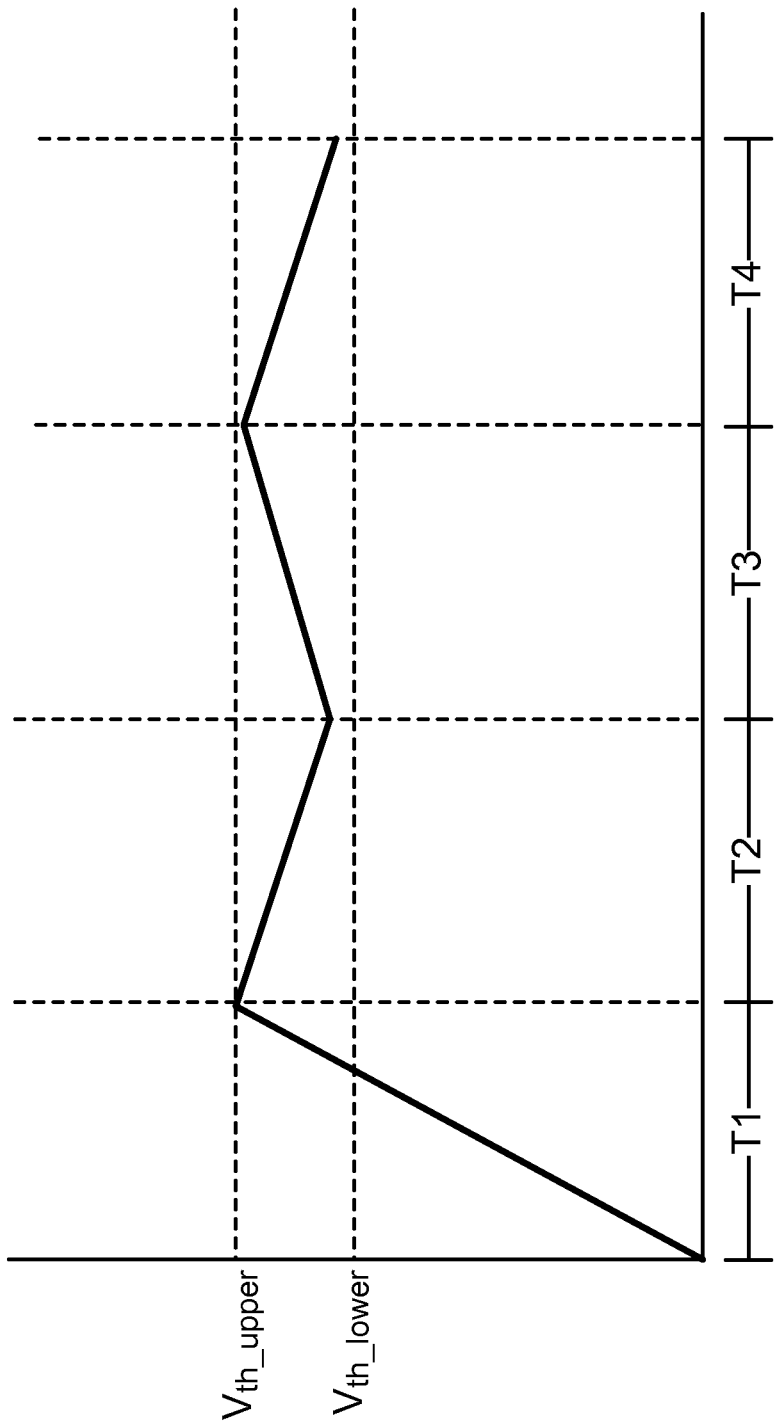
FIG. 17 illustrates another timing diagram, in accordance with an exemplary embodiment of the present invention.

FIG. 17 is another timing diagram illustrating an energy level of an energy storage device (e.g., accumulator 708) of first electronic device 902 over time, wherein wireless charger 906 is conveying wireless power to first electronic device 902 and a second electronic device 904 according to a time domain multiplexing method. In this embodiment, energy is not conveyed from an accumulator (e.g., accumulator 708) to an energy storage device (e.g., energy storage device 706) until a charging level of the accumulator reaches an upper threshold value Vth_upper. Furthermore, after the charging level of the accumulator reaches the upper threshold value Vth_upper, energy is continuously conveyed from the accumulator to the energy storage device until the charging level of the accumulator drops below a lower threshold value Vth_lower. During a first time slot T1, wireless charger 906 is conveying wireless power to first electronic device 902 and, as a result, an energy level the accumulator increases and reaches upper threshold value Vth_upper. During each of time slots T2 through T4, energy is being conveyed from the accumulator to the energy storage device. Further, during a second time slot T2 and a fourth time slot T4, wireless charger 906 is conveying power to second electronic device 904 and, therefore, a voltage level of the accumulator of the first electronic device 902 is decreasing. Moreover, during a third time slot T3, wireless charger 906 is conveying power to first electronic device 902.

As will be appreciated by a person having ordinary skill in the art, battery design may comprise trade-offs between size, weight, shape, life cycle, internal resistance, low self-discharge and/or charging rate. It may desirable for a battery to have a useful charge after an extended period (e.g., a few days) of little or no use. This requires a battery with low self-discharge. It may also be desirable to quickly recharge the battery, which requires a battery with low internal resistance and an ability to absorb the charge without physically swelling. By incorporating a battery that is optimized for long life, low weight, and low self-discharge, charging time may suffer (i.e., the battery takes longer to charge). Moreover, by using a battery that can be recharged quickly, the life cycle may be shortened, the self discharge may increase and a heavy metal casing may not be required to constrain the swelling effect of a rapid charge.

According to various exemplary embodiments of the present invention, an electronic device may comprise two or more energy storage devices (e.g., batteries), which may enable for enhanced operation of the electronic device. In accordance with one exemplary embodiment, an electronic device may include a first energy storage device (e.g., energy storage device 946 as described below), which may be configured as a chargeable energy storage device with a low internal resistance and, thus, may enable for shorter charging times relative to charging time of a second energy storage device (e.g., energy storage device 948 as described below). Furthermore, the electronic device may include a second energy storage device (e.g., energy storage device 948 as described below), which may comprise a high internal resistance and, thus, may be configured to have a "long-life" in comparison to the first energy storage device. Furthermore, as described more fully below, the first energy storage device may comprise a relatively high voltage battery in relation to the second energy storage device, which may comprise a low voltage battery. It is noted that a battery chemistry of the first energy storage device may be selected to enable for relatively short charging times. Similarly, a battery chemistry of the second energy storage device may be selected to enhance life duration.

For example, during a contemplated operation, the first energy storage device may be quickly charged by a charger (e.g., a wireless or a wired charger) and, thereafter, may slowly convey energy to the second energy storage device for charging thereof. By way of example only, the first energy storage device may comprise a plurality of cells in series to enable for charge and discharge at a relatively high voltage in comparison to the second energy storage device, which may enable for efficient charging due to increased energy captured at the same current flow. Moreover, in comparison to the second energy storage device, the first energy storage device may comprise an enhance impedance match to a high Q wireless power receiver. By way of example, energy may be conveyed from the first energy storage device to the second energy storage device via a power converter (e.g., a buck DC-to-DC converter).

Figure 18:
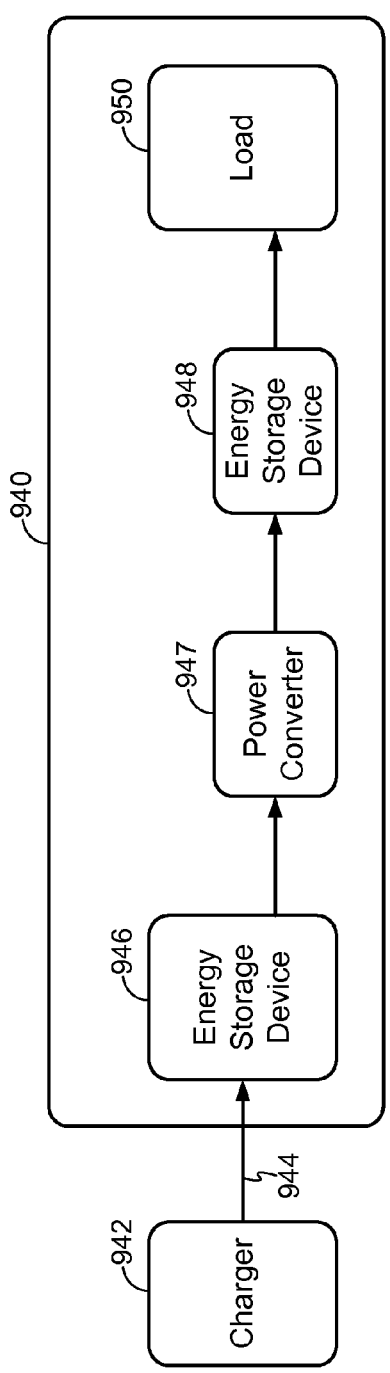
FIG. 18 illustrates an electronic device, in accordance with an exemplary embodiment of the present invention.

FIG. 18 illustrates an electronic device 940 configured to receive power from a charger 942 via a wired connection 944. Electronic device 940 comprises a first energy storage device 946, which may comprise a low internal resistance and, thus, may enable for relatively short charging times. For example only, first energy storage device 946 may comprise a high voltage battery in comparison to second energy storage device 948. It is noted that first energy storage device 946 may comprise an accumulator, such as accumulator 708 described above. Furthermore, first energy storage device 946 may be configured to convey energy to a second energy storage device 948 via a power converter 947 (e.g., a buck converter). Second energy storage device 948 may comprise a high internal resistance and, thus may be configured as a long-life rechargeable energy storage device. As a non-limiting example, second energy storage device 948 may comprise a low voltage battery in comparison to first energy storage device 946. Furthermore, second energy storage device 948 may be configured to convey energy to a load 950.

Figure 19:
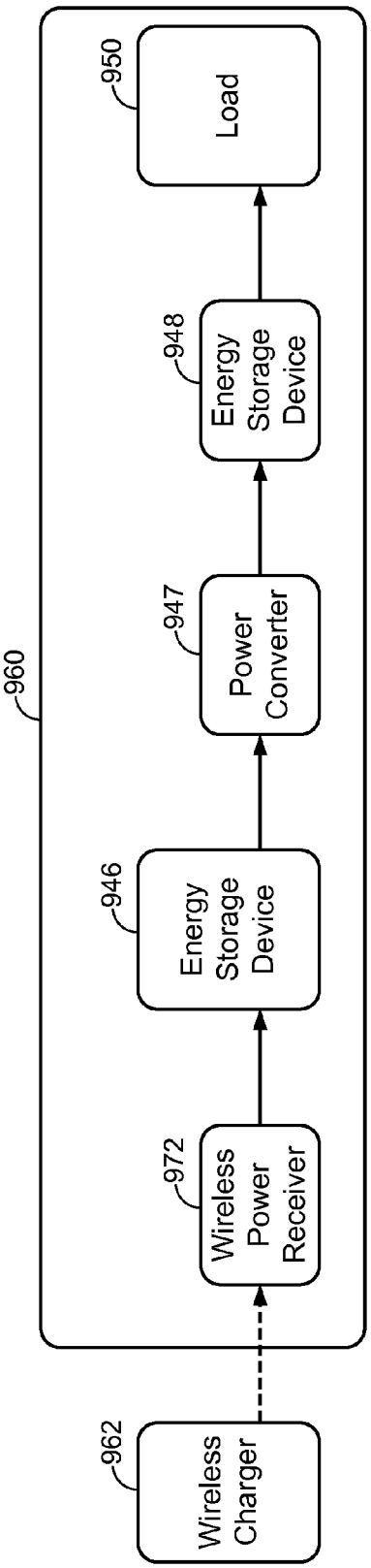
FIG. 19 illustrates another electronic device, in accordance with an exemplary embodiment of the present invention.

FIG. 19 illustrates another electronic device 960 configured to wirelessly receive power from a wireless charger 962. Electronic device 960 comprises a wireless power receiver 972 operably coupled to first energy storage device 946, which, as noted above, may comprise, for example only, a battery having a voltage higher than second energy storage device 948. Additionally, as noted above, first energy storage device 946 may comprise an accumulator, such as accumulator 708 described above. Furthermore, first energy storage device 946 may be configured to convey energy to second energy storage device 948 via power converter 947(e.g., a buck converter). As noted above, second energy storage device 948 may comprise, for example only, a battery having a voltage lower than first energy storage device 946. Furthermore, second energy storage device 948 may be configured to convey energy to load 950.

It is noted that, according to one exemplary embodiment, first energy storage device 946 may be made removable from an associated device (e.g., electronic device 960 or electronic device 940). More specifically, for example, a device (e.g., electronic device 960 or electronic device 940) may be configured to enable first energy storage device 946 to be "hot swappable," meaning that first energy storage device 946 may be removed and replaced with a different energy storage device without turning off or otherwise disabling electronic device 960 or electronic device 940. For example, if a user wishes to replace first energy storage device 946 with a freshly recharged energy storage device, the user may remove and replace first energy storage device 946 when first energy storage device 946 is partially or fully discharged. Other examples of "hot swappable" will be understood by a person having ordinary skill in the art. According to another exemplary embodiment, first energy storage device 946 may comprise a third party add-on to an existing electronic device (e.g., electronic device 960 or electronic device 940). Furthermore, it is noted that an electronic device (e.g., electronic device 960 or electronic device 940) may be configured to operate while first energy storage device 946 is decoupled from the electronic device. Accordingly, first energy storage device 946 may be recharged at, for example only, a public kiosk while the electronic device (e.g., electronic device 960 or electronic device 940) remains with a device user, is used by the device user, or both. It is additionally noted that first energy storage device 946 may be coupled to, and possibly embedded within, a housing (e.g., housing 802, housing 852, or housing 902), which may comprise a sleeve, a shell, a cage, a case, a cover, or any combination thereof.

Figure 20:
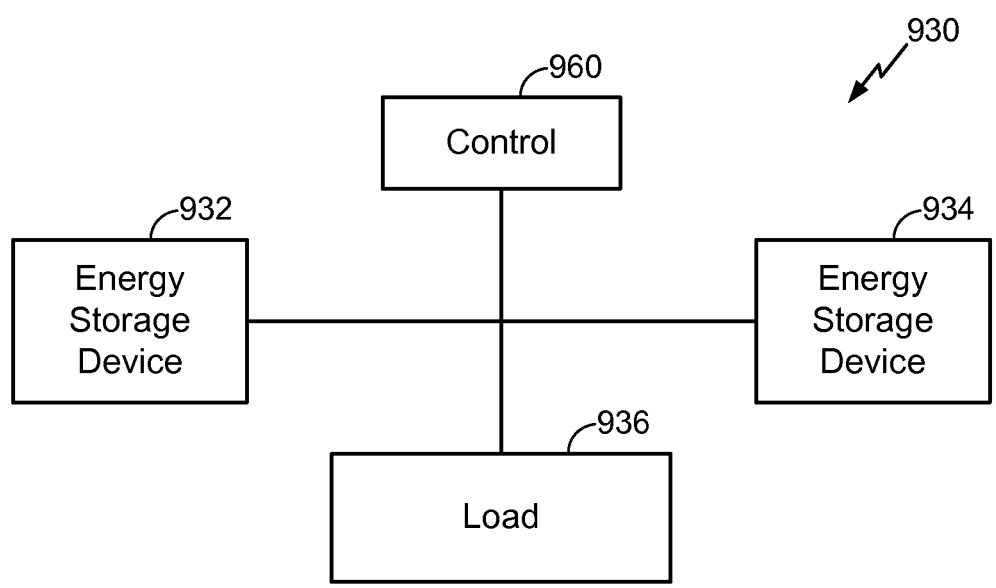
FIG. 20 illustrates an electronic device including a plurality of energy storage devices, according to an exemplary embodiment of the present invention.

With reference to FIG. 20, an electronic device 930 including a first energy storage device 932 and a second energy storage device 934 is illustrated. Electronic device 930 further includes a load 936 coupled to each of first energy storage device 932 and second energy storage device 934. In addition, electronic device 930 may include one or more control blocks 960 comprising one or more processors, one or more sensors, or a combination thereof, for carrying out various exemplary embodiments related to electronic device 930, as described below.

According to one exemplary embodiment, each of first energy storage device 932 and second energy storage device 934 may comprise a wirelessly chargeable battery. Furthermore, in this exemplary embodiment, first energy storage device 932 may comprise a primary source of power for load 936 and will only be charged (i.e., receive wireless power) after being fully discharged. Furthermore, it is noted that first energy storage device 932 may be fully charged prior to beginning to convey energy to load 936. Accordingly, first energy storage device 932 will not begin to receive energy from a wireless power source (not shown) until first energy storage device 932 is substantially fully discharged, and first energy storage device 932 will not begin to convey energy to load 936 until first energy storage device 932 has been substantially fully charged by the wireless power source. As a result, as will be understood by a person having ordinary skill in the art, regularly discharging first energy storage device 932 may extend the life of energy storage device 932. Second energy storage device 934 may comprise a secondary source of power for load 936 and may receive energy from a wireless power source at anytime second energy storage device 934 is within range of a wireless power source (not shown). Furthermore, second energy storage device 934 may be configured to convey energy to load 936 an anytime while first energy storage device 932 is unable to convey energy to load 936. More specifically, for example, second energy storage device 934 may be configured to convey energy to load 936 while first energy storage device 932 is substantially fully discharged or while first energy storage device 932 is being charged.

In accordance with another exemplary embodiment, first energy storage device 932 may comprise a wirelessly chargeable battery and second energy storage device 934 may comprise a legacy battery. Furthermore, in this exemplary embodiment, first energy storage device 932 may comprise a primary source of power for load 936 and may be charged (i.e., receive wireless power) at anytime while within range of a wireless power source. Furthermore, second energy storage device 934 may be configured to convey energy to load 936 at anytime while first energy storage device 932 is unable to convey energy to load 936. For example, if first energy storage device 932 lacks a sufficient charging level to convey energy and first energy storage device 932 is not within range of a wireless power source, second energy storage device 934 second energy storage device 934 may convey energy to load 936.

According to another exemplary embodiment, first energy storage device 932 may comprise a non-rechargeable battery, such as, for example only, a hydrogen battery. Moreover, second energy storage device 934 may comprise a wirelessly chargeable battery. Furthermore, in this exemplary embodiment, first energy storage device 932 may comprise a primary source of power for load 936 and may be configured to convey energy to load 936 until a charging level of first energy storage device 932 becomes insufficient to convey energy. Upon a charging level of first energy storage device 932 becoming insufficient to convey energy, second energy storage device 934 may convey energy to load 936. Second energy storage device 934 may convey energy to load 936 until first energy storage device 932 is replaced with another non-rechargeable battery having an adequate charging level to convey energy to load 936.

According to another exemplary embodiment, first energy storage device 932 may comprise a wirelessly chargeable battery, while second energy storage device 934 may comprise a non-rechargeable battery, such as, for example only, a nickel oxyhydroxide battery. Furthermore, in this exemplary embodiment, first energy storage device 932 may comprise a primary source of power for load 936 and may be configured to convey energy to load 936 until a charging level of first energy storage device 932 becomes insufficient to convey energy. Upon a charging level of first energy storage device 932 becoming insufficient to convey energy, second energy storage device 934, which may be configured as a backup power source, may convey energy to load 936. Second energy storage device 934 may convey energy to load 936 until first energy storage device 932 is recharged to an adequate charging level to convey energy to load 936. Furthermore, electronic device 930 may be configured to operate in a low-power mode when second energy storage device 934 is conveying power to load 936.

In accordance with another exemplary embodiment, first energy storage device 932 may comprise a battery configured to receive energy from a renewable energy source (e.g., solar power, wind power, etc.). In addition, second energy storage device 934 may comprise a wirelessly chargeable battery. In this embodiment, first energy storage device 932 may comprise a primary source of power for load 936 and second energy storage device 934 may comprise a secondary source of power for load 936. More specifically, for example, if a charging level of first energy storage device 932 becomes insufficient to convey energy due to, for example only, a lack of sunlight, second energy storage device 934 may convey energy to load 936.

In another exemplary embodiment, first energy storage device 932 may comprise a wirelessly chargeable battery and second energy storage device 934 may comprise a battery configured to receive energy from a renewable energy source (e.g., solar power, wind power, etc.). In this embodiment, first energy storage device 932 may comprise a primary source of power for load 936 and second energy storage device 932 may comprise a secondary, backup source of power for load 936. More specifically, for example, after receiving a charge via a renewable energy source (e.g., solar power) second energy storage device 934 may operate as backup source of power for load in the event a charging level of first energy storage device 932 becomes insufficient to convey energy to load 936. It is noted that, according to one exemplary embodiment, the renewable energy source may supply power to the energy storage device having the smaller storage capacity.

In accordance with yet another exemplary embodiment, first energy storage device 932 may be configured to convey energy for powering one or more specific applications of electronic device 930 and second energy storage device 932 may be configured to convey energy for powering one or more other applications of electronic device 930. More specifically, as an example, first energy storage device 932 may be configured to convey energy for powering PDA applications and second energy storage device 934 may be configured to convey energy for powering voice connectivity functions. However, it is noted that in this example, although second energy storage device 934 may be configured to convey energy for powering voice connectivity functions, second energy storage device 934 may also be configured to convey energy for powering PDA applications in the event first energy storage device 932 is unable to provide power for any reason (e.g., due to a lack of charge). Similarly, first energy storage device 932 may be configured to convey energy for powering voice connectivity functions in the event second energy storage device 934 is unable to provide power for any reason.

It is noted that for the embodiment described above with reference to FIG. 20, electronic device 930 may be configured to enable for "hot swapping" of first energy storage device 932 and second energy storage device 934. Stated another way, electronic device 930 may be configured to enable second energy storage device 934 to replace first energy storage device 934 (i.e., second energy storage device 934 may convey power to load if first energy storage device 932 is unable to convey energy) without interrupting operation of electronic device 930.

Figure 21:
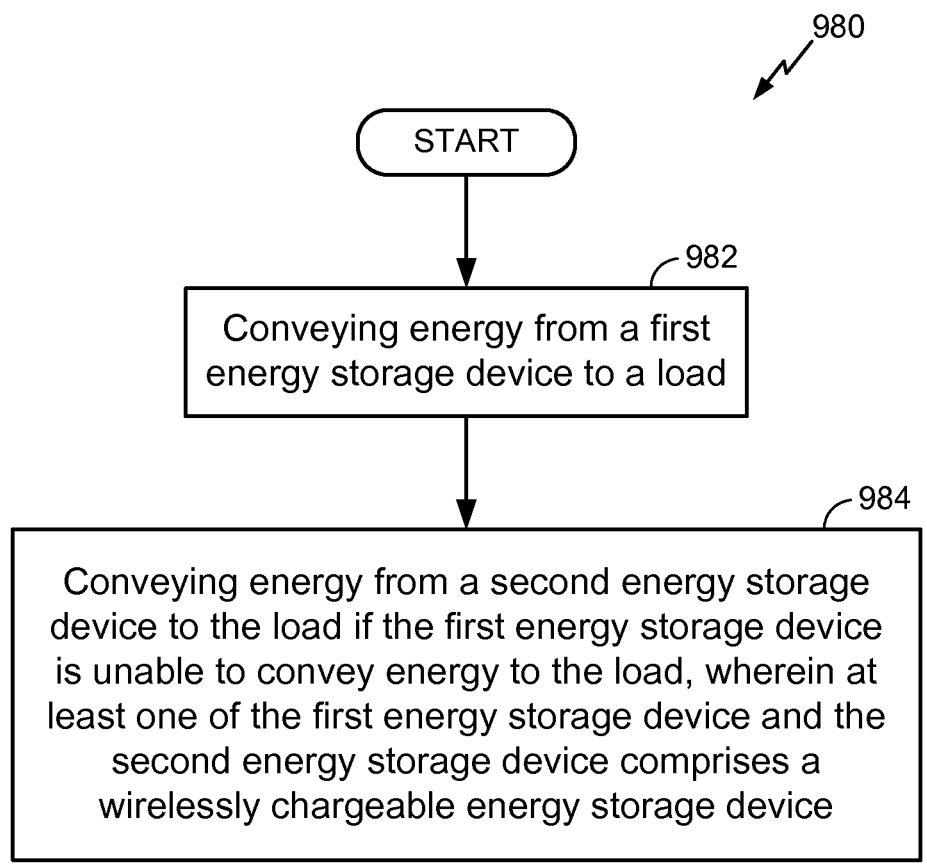
FIG. 21 is another flowchart illustrating a method, in accordance with an exemplary embodiment of the present invention.

FIG. 21 is a flowchart illustrating a method 980, in accordance with one or more exemplary embodiments. Method 980 may include conveying energy from a first energy storage device to a load. (depicted by numeral 982). Method 980 may further include conveying energy from a second energy storage device to the load if the first energy storage device is unable to convey energy to the load, wherein at least one of the first energy storage device and the second energy storage device comprises a wirelessly chargeable energy storage device (depicted by numeral 984).

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the exemplary embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments of the invention.

The various illustrative logical blocks, modules, and circuits described in connection with the exemplary embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the exemplary embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the exemplary embodiments shown herein but is to be accorded the widest scope consistent with the principles and novel features disclosed herein.

What is claimed is:

1. A method for supplying a steady level of power to a device, comprising:
   receiving wireless power with a receiver from an electronic device, the receiver coupled to a housing configured to accommodate another electronic device;
   charging a first energy storage device with the wirelessly received power; and
   conveying energy from the first energy storage device to a second energy storage device upon a charging level of the first energy storage device reaching a threshold level.

2. The method of claim 1, further comprising terminating the conveyance of energy from the first energy storage device to the second energy storage device upon a charging level of the first energy storage device dropping below either the threshold level or another threshold level having a value lower than a value of the threshold level.

3. The method of claim 1, further comprising conveying the wirelessly received power to the first energy storage device.

4. The method of claim 1, further comprising conveying power from a receiver operably coupled to the first energy storage device to the second energy storage device.

5. The method of claim 1, wherein the receiving comprises receiving wireless power with a receive antenna coupled to a cover of the housing.

6. The method of claim 1, wherein the receiving comprises receiving wireless power with a receiver integrated within the another electronic device comprising at least one of a cellular telephone, a portable media player, a camera, a gaming device, a navigation device, a headset, a tool, and a toy.

7. The method of claim 1, wherein the charging comprises charging at least one of a battery, an ultracapacitor, and a mechanical storage device.

8. A device for supplying power, comprising:
   means for receiving wireless power from an electronic device, the receiving means coupled to a housing configured to accommodate another electronic device;
   means for charging a first energy storage device with the wirelessly received power; and
   means for conveying energy from the first energy storage device to a second energy storage device upon a charging level of the first energy storage device reaching a threshold level.

9. A device for supplying power, comprising:
   a first energy storage device configured to receive and store energy;
   a second energy storage device configured to receive energy from the first energy storage device, at least one of the first energy storage device and the second energy storage device comprising an energy storage device that is charged wirelessly with energy received from an electronic device;
   at least one controller operably coupled to the first energy storage device and configured to transfer energy from the first energy storage device to the second energy storage device; and
   a housing configured to accommodate another electronic device.

10. The device of claim 9, wherein the device comprises at least one of a cellular telephone, a portable media player, a camera, a gaming device, a navigation device, a headset, a tool, and a toy.

11. The device of claim 9, wherein the housing comprises at least one of a sleeve, a shell, a cage, a case, and a cover.

12. The device of claim 9, wherein at least a portion of a receiver is coupled to the housing.

13. The device of claim 9, further comprising a receive antenna coupled to a cover of the housing.

14. The device of claim 9, wherein the housing is configured to enable a device user to operate the electronic device while the electronic device is positioned within the housing.

15. The device of claim 9, wherein the housing comprise one or more access openings for accessing one or more input or output devices.

16. The device of claim 15, further comprising an electrical connector positioned within at least one access opening and configured to couple a port of the electronic device positioned within the housing to the at least one controller.

17. The device of claim 9, wherein the at least one controller comprises a first controller operably coupled to each of a receiver and the first energy storage device and a second controller operably coupled to each of the first energy storage device and the second storage device.

18. The device of claim 17, wherein the first controller is configured to receive power from the receiver and convey power to at least one of the first energy storage device and the second controller.

19. The device of claim 17, wherein the second controller is configured to receive energy from at least one of the first energy storage device and the first controller and convey power to the second energy storage device.

20. The device of claim 9, further comprising an electrical connector configured to couple the at least one controller to the second energy storage device.

21. The device of claim 9, further comprising a power converter operably coupled between the first energy storage device and the second energy storage device.

22. The device of claim 9, wherein at least one of the first and second energy storage devices is external to the device.

23. The device of claim 9, wherein an internal resistance of the first energy storage device is lower than an internal resistance of the second energy device.

24. The method of claim 1, wherein an internal resistance of the first energy storage device is lower than an internal resistance of the second energy storage device.

25. The method of claim 1, wherein the first energy storage device is configured to charge faster than the second energy storage device, and wherein the second energy storage device has a longer life than the first energy storage device.

26. The method of claim 1, wherein another electronic device comprises the first energy storage device and the second energy storage device, and wherein the first energy storage device is removable while the another electronic device is operating.

27. The method of claim 1, further comprising charging the first energy storage device at a higher voltage than the second energy storage device.

28. The device of claim 8, further comprising means for terminating the conveyance of energy from the first energy storage device to the second energy storage device upon a charging level of the first energy storage device dropping below either the threshold level or another threshold level having a value lower than a value of the threshold level.

29. The device of claim 8, wherein the first energy storage device is configured to charge faster than the second energy storage device, and wherein the second energy storage device has a longer life than the first energy storage device.

30. The device of claim 8, further comprising means for continuing to operate the device when the first energy storage device is removed from the device.

31. The device of claim 8, further comprising means for charging the first energy storage device at a higher voltage than the second energy storage device.

32. The device of claim 8, wherein an internal resistance of the first energy storage device is lower than an internal resistance of the second energy storage device.

33. The device of claim 8, wherein means for charging a first energy storage and means for conveying energy from the first energy storage device to a second energy storage device comprise a processor.

34. The device of claim 9, wherein the first energy storage device is configured to charge and discharge at a higher voltage than the second energy storage device.

35. The method of claim 1, further comprising:
conveying energy from the first energy storage device to a load; and
conveying energy from the second energy storage device to the load if the first energy storage device is unable to convey energy to the load.

36. The method of claim 35, wherein at least one of the first energy storage device and the second energy storage device comprises a wirelessly chargeable energy storage device.

37. The device of claim 9, wherein the first energy storage device is further configured to convey energy to a load, and wherein the second energy storage device is further configured to convey energy to the load if the first energy storage device is unable to convey energy to the load.

* * * * *

UNITED STATES PATENT AND TRADEMARK OFFICE
CERTIFICATE OF CORRECTION

PATENT NO. : 8,853,995 B2
APPLICATION NO. : 12/780649
DATED : October 7, 2014
INVENTOR(S) : William H. Von Novak et al.

Page 1 of 1

It is certified that error appears in the above-identified patent and that said Letters Patent is hereby corrected as shown below:

In the Claims

In column 21 at line 13, In Claim 1, after "supplying" delete "a steady level of".

Signed and Sealed this
Nineteenth Day of May, 2015

Michelle K. Lee
*Director of the United States Patent and Trademark Office*